(12) United States Patent
Fukuta

(10) Patent No.: US 6,226,095 B1
(45) Date of Patent: *May 1, 2001

(54) IMAGE PROCESSING APPARATUS, METHOD, AND SYSTEM

(75) Inventor: Shigenori Fukuta, Kawaguchi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,117

(22) Filed: Oct. 3, 1997

(30) Foreign Application Priority Data

Oct. 4, 1996 (JP) .................................. 8-264373
Oct. 22, 1996 (JP) .................................. 8-279427

(51) Int. Cl.$^7$ ........................................ B41B 19/00
(52) U.S. Cl. .................... 358/1.13; 711/153; 711/165
(58) Field of Search ........................ 395/113; 711/165, 711/153; 358/1.13; 345/1, 2

(56) References Cited

U.S. PATENT DOCUMENTS

| | | | |
|---|---|---|---|
| 5,156,468 | * 10/1992 | Uematsu | 400/68 |
| 5,287,194 | * 2/1994 | Lobiondo | 358/296 |
| 5,450,130 | * 9/1995 | Foley | 348/391 |
| 5,727,220 | * 3/1998 | Hohensee et al. | 395/774 |
| 5,999,709 | * 12/1999 | Fiala et al. | 358/1.14 |

OTHER PUBLICATIONS

Shaw, et al., *Microsoft Office 6–in–1 New Edition*, pp. 100, 587–588, 1994.*

* cited by examiner

*Primary Examiner*—Mark Zimmerman
*Assistant Examiner*—Lance W. Sealey
(74) *Attorney, Agent, or Firm*—Fitzpatrick, Cella, Harper & Scinto

(57) ABSTRACT

An image processing apparatus is connected to two copying machines and has independent frame memories, FIFOS, and I/Fs for the copying machines. Tasks for generating image data for the copying machines are independent and are executed in parallel. When a fault occurs in one copying machine, the memory area allocated to the copying machine is reduced, and the area is reallocated to the other copying machine. Even when image data are to be printed from a plurality of copying machines, and an error is generated in one copying machine, the remaining copying machines can print normally or more efficiently than in a normal state.

21 Claims, 22 Drawing Sheets

IMAGE PROCESSING APPARATUS, METHOD, AND SYSTEM

BACKGROUND OF THE INVENTION

1. Field of the Invention

The present invention relates to an image processing apparatus and system which receive image data (to be referred to as PDL data hereinafter) described in a page description language (PDL) and form an image on the basis of the PDL data.

2. Description of the Related Art

In recent years, a system which receives a print job (including PDL data as data to be printed) from a host computer through a network, converts (to be referred to as image development hereinafter) the PDL data included in the print job into print data in an image processing apparatus, and sends the print data to a printing device such as a high-quality color copying machine, thereby printing the print data on a paper sheet or OHP sheet has already been proposed. Such processing of causing a printing device to print image data through a network is called remote printing.

A system for apparently causing one image processing apparatus to perform control for two color copying machines has also been proposed.

In this conventional system, image development for the two color copying machines is performed by running one PDL developing task in the image processing apparatus. When a print job for one color copying machine is sent while image development for printing in the other color copying machine is being performed, the user who has sent the print job must wait until the first image development processing is ended, and printing is complete. Especially, a heavy print job for a large quantity of image data takes a long time for image development, so the user must wait for a long time.

Assume that an engine error is generated on one color copying machine side. In this case, printing cannot be continued unless some measure is taken, e.g., jammed sheets are removed. Some image processing apparatuses reject subsequent print jobs because, in practice, printing is disabled. Some apparatuses perform only image development for a predetermined number of frame buffer pages because of the limited capacity of the internal image frame memory, and thereafter, perform no image development anymore.

Assume that, in such a system, a user issues a print request to a color copying machine having no error. Since the image processing apparatus has only one PDL developing task, the apparatus does not accept the print request although the color copying machine can print in fact. For this reason, the user must wait until the engine error of the other copying machine is canceled, and the print job which has caused the engine error is completely processed.

As described above, the conventional printing system has a relatively low productivity because the available resources cannot be sufficiently utilized.

SUMMARY OF THE INVENTION

The present invention has been made in consideration of the above problem, and has as its object to provide an image processing apparatus and system which simultaneously run PDL developing tasks corresponding to printing devices to perform parallel processing (PDL developing tasks exist in correspondence with the number of color copying machines), and when an engine error is generated in one copying machine, assign a resource which is originally used for the task for the printing device having the error to a PDL developing task for the other printing device, thereby efficiently utilizing the resource.

It is another object of the present invention to provide an image processing apparatus, method, and system for storing print data for a copying machine having an error to enable recovery after the error is canceled.

It is still another object of the present invention to provide an image processing apparatus, method, and system for, even when an error which requires intervention by the user is generated in one printing device under control, minimizing the influence on print jobs for the remaining printing devices and also suppressing an increase in resources necessary for this operation.

In order to achieve the above objects, according to the present invention, there is provided an image processing apparatus connected to at least two output devices, comprising:

storage means whose storage areas are respectively allocated to the output devices;

detection means for detecting states of the output devices;

image generation means for independently generating image data to be output from the output devices using the storage areas allocated to the output devices; and area change means for, when an error state is detected in one output device by the detection means, reallocating at least part of the storage area allocated to the one output device in which the error state is detected to the other output device in which no error state is detected.

There is also provided an image processing apparatus connected to at least two output devices for printing image data, comprising:

detection means for detecting states of the output devices;

image generation means for independently generating image data to be output from the output devices using storage areas allocated to the output devices; and save means for, when an error state is detected in one output device by the detection means, saving the image data generated for the one output device in which the error state is detected.

There is also provided an image processing method in an information processing apparatus connected to at least two output devices, comprising:

the detection step of detecting states of the output devices;

the area change step of, when an error state is detected in one output device in the detection step, reallocating at least part of a storage area allocated to the one output device in which the error state is detected to the other output device in which no error state is detected; and the image generation step of independently generating image data for the output devices using the storage areas allocated to the output devices.

There is also provided an image processing method in an information processing apparatus connected to at least two output devices, comprising:

the detection step of detecting states of the output devices;

the image generation step of independently generating image data for the output devices using storage areas allocated to the output devices; and the save step of, when an error state is detected in one output device in the detection step, saving the image data generated for the one output device in which the error state is detected.

There is also provided an image processing system including an image processing apparatus and at least two image forming apparatuses, wherein the image processing apparatus comprises:
   storage means whose storage areas are respectively to the image forming apparatuses;
   detection means for detecting states of the image forming apparatuses;
   image generation means for independently generating image data to be output from the image forming apparatuses using the storage areas allocated to the image forming apparatuses; and
   area change means for, when an error state is detected in one image forming apparatus by the detection means, reallocating at least part of the storage area allocated to the one image forming apparatus in which the error state is detected to the other image forming apparatus in which no error state is detected, and each image forming apparatus comprises:
   reception means for receiving the image data generated from the image processing apparatus; and
   output means for printing the received image data.

There is also provided an image processing system including an image processing apparatus and at least two image forming apparatuses,
   wherein the image processing apparatus comprises:
      detection means for detecting states of output devices;
      image generation means for independently generating image data to be output from the output devices using storage areas allocated to the output devices; and
      save means for, when an error state is detected in one output device by the detection means, saving the image data generated for the one output device in which the error state is detected, and
   each image forming apparatus comprises:
      reception means for receiving the image data generated from the image processing apparatus; and
      output means for printing the received image data.

There are also provided program steps which are stored in a computer-readable storage medium and can be executed by a computer to output an image from at least two output devices, comprising:
   the detection step of detecting states of the output devices;
   the image generation step of independently generating image data to be output from the output devices using storage areas allocated to the output devices; and
   the area change step of, when an error state is detected in one output device in the detection step, reallocating at least part of the storage area allocated to the one output device in which the error state is detected to the other output device in which no error state is detected.

There are also provided program steps which are stored in a computer-readable storage medium and can be executed by a computer to output an image from at least two output devices, comprising:
   the detection step of detecting states of the output devices;
   the image generation step of independently generating image data to be output from the output devices using storage areas allocated to the output devices; and
   the save step of, when an error state is detected in one output device in the detection step, saving the image data generated for the one output device in which the error state is detected.

There is also provided an image processing apparatus connected to at least two image forming apparatuses, comprising:
   conversion means for converting image information having a predetermined format into image data having a format adapted to the image forming apparatus using a predetermined storage area;
   save means for receiving a state of the image forming apparatus from which image data is to be output and, when image formation is disabled, saving the image data obtained by the conversion means from the storage area to a predetermined storage; and
   recovering means for monitoring the state of the image forming apparatus from which the image data saved by the save means is to be output and, when image formation is enabled, outputting the data saved by the save means to the image forming apparatus for forming the image data.

There is also provided an image processing system including at least two image forming apparatuses and an image processing apparatus,
   wherein the image processing apparatus comprises:
      conversion means for converting image information having a predetermined format into image data having a format adapted to the image forming apparatus using a predetermined storage area;
      save means for receiving a state of the image forming apparatus from which image data is to be output and, when image formation is disabled, saving the image data obtained by the conversion means from the storage area to a predetermined storage; and
      recovering means for monitoring the state of the image forming apparatus from which the image data saved by the save means is to be output and, when image formation is enabled, outputting the data saved by the save means to the image forming apparatus for forming the image data, and
   each image forming apparatus forms an image from the image data having the format converted by the conversion means.

There is also provided an image processing method of forming an image using at least two image forming apparatuses, comprising:
   the conversion step of converting image information having a predetermined format into image data having a format adapted to the image forming apparatus using a predetermined storage area;
   the save step of receiving a state of the image forming apparatus from which image data is to be output and, when image formation is disabled, saving the image data obtained in the conversion step from the storage area to a predetermined storage; and
   the recovering step of monitoring the state of the image forming apparatus from which the image data saved in the save step is to be output and, when image formation is enabled, outputting the data saved in the save step to the image forming apparatus for forming the image data.

There are also provided program steps which are stored in a computer-readable storage medium and can be executed by a computer to output an image from at least two output devices, comprising:
   the conversion step of converting image information having a predetermined format into image data having a format adapted to the image forming apparatus using a predetermined storage area;
   the save step of receiving a state of the image forming apparatus from which image data is to be output and, when image formation is disabled, saving the image data obtained in the conversion step from the storage area to a predetermined storage; and the recovering step of monitoring the state of the image forming apparatus from which the image data saved in the save step is to be output and, when image formation is enabled, outputting the data saved in the save step to the image forming apparatus for forming the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

A printing system according to a preferred embodiment of the present invention will be described below in detail.

In the embodiment to be described below, a system including color copying machines and an image processing apparatus will be exemplified as an application example of the present invention. However, the present invention is not limited to this and can be applied not only to color copying machines but also to various devices such as monochrome or color printers.

Figure 1:
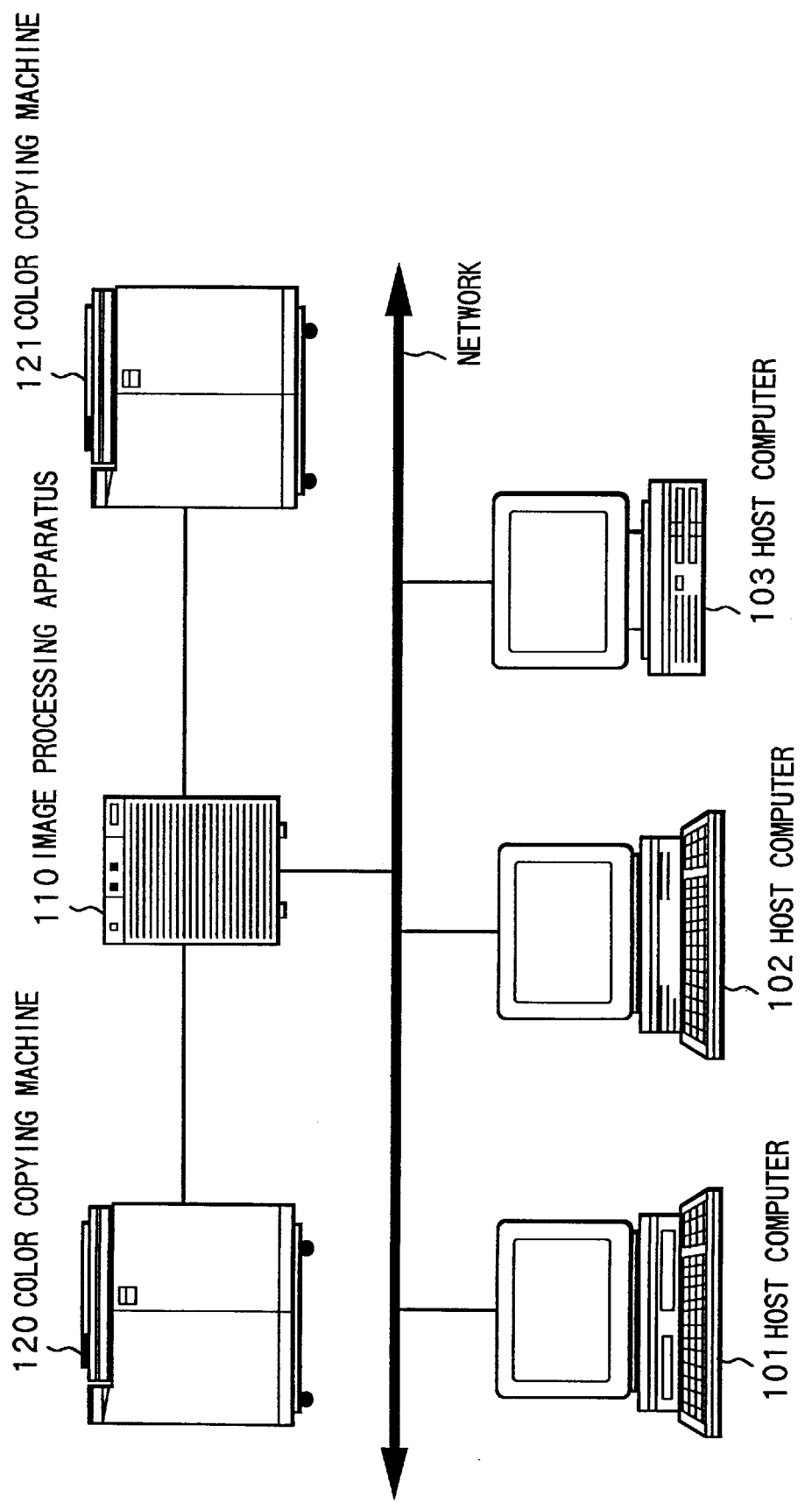
FIG. 1 is a view showing the system configuration of an image processing/forming system.

FIG. 1 is a view showing the system configuration of an image processing/forming system according to an embodiment of the present invention.

As shown in FIG. 1, the system of this embodiment is constituted by color copying machines 120 and 121 each comprising a color image read unit for reading an original image and a color image printing unit for printing a color image in color/gray scale, an image processing apparatus 110 connected to the color copying machines 120 and 121 and a network, and a plurality of host computers 101 to 103 connected to the network.

In this arrangement, each of the color copying machines 120 and 121 comprises a scanner unit for reading an original and outputting it as image data, and a printer unit for printing the input image data. The color copying machines 120 and 121 can be independently used. More specifically, each of the color copying machines 120 and 121 can be used not only to exploit its original function as a copying machine but also to send image data read through the scanner unit to the image processing apparatus 110 or print image data sent from the image processing apparatus 110. The original operation of the copying machine, i.e., the operation of copying an image read with the scanner unit will be called local copy processing.

The color copying machine will be described first in detail.

Schematic Arrangement of Device

Figure 2:
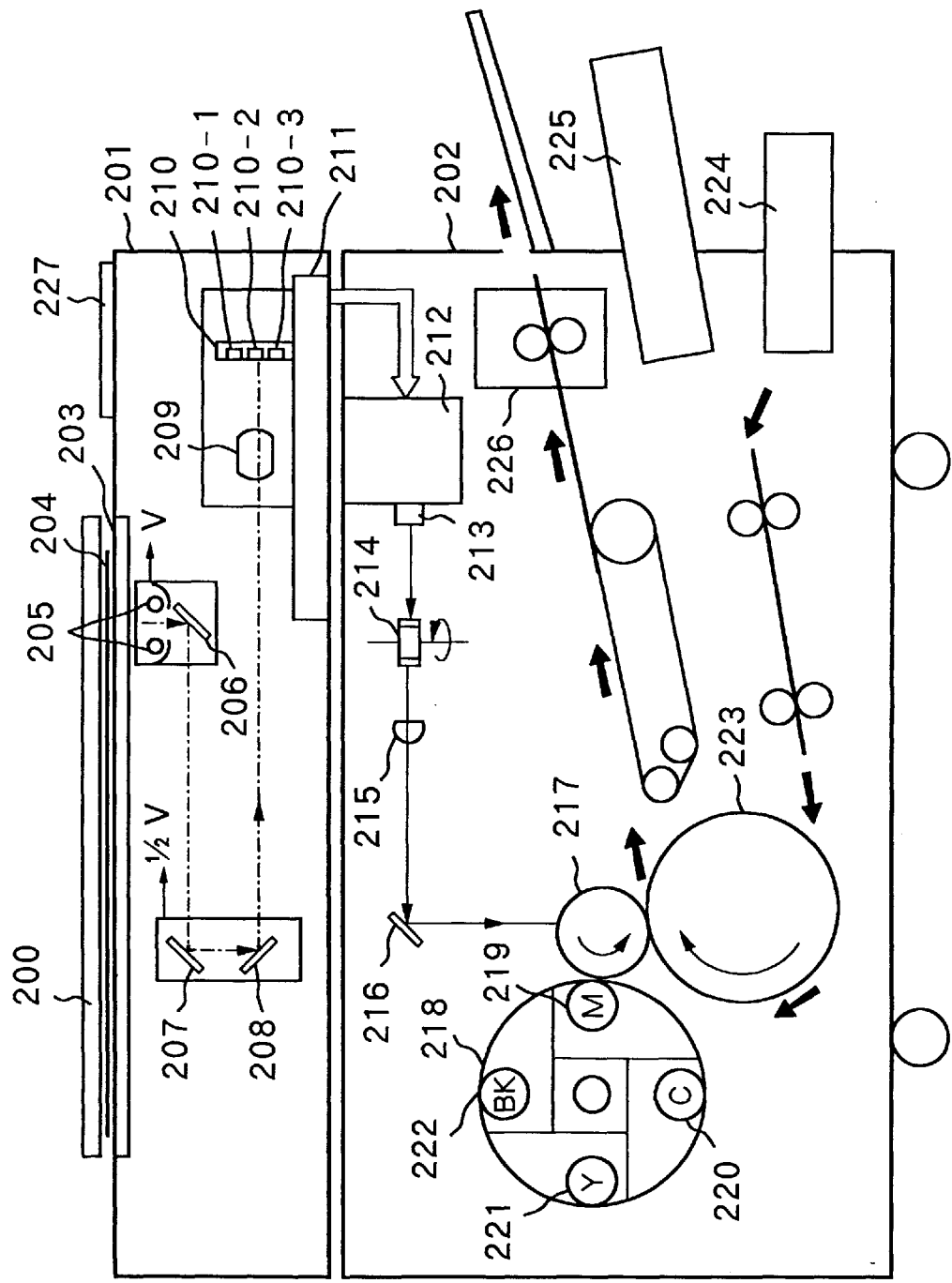
FIG. 2 is a sectional view showing the internal arrangement of a color copying machine.

FIG. 2 shows the schematic arrangement of the color copying machine 120 or 121. Referring to FIG. 2, an image scanner unit 201 reads an original at a resolution of 400 dpi (dots/inch) and performs digital signal processing. A printer unit 202 prints a full-color image corresponding to the original image read with the image scanner unit 201 on a paper sheet at a resolution of 400 dpi.

In the image scanner 201, a mirror plate 200 presses an original 204 on an original table glass plate (to be referred to as a platen hereinafter) 203. The original 204 on the platen 203 is illuminated with light from a lamp 205. The reflected light is guided to mirrors 206, 207, and 208 to form an image on a three-line sensor (to be referred to as a CCD hereinafter) 210 through a lens 209, and sent to a signal processing unit 211 as full color information including red (R), green (G), and blue (B) components. The lamp 205 and the mirror 206 are mechanically moved in a direction perpendicular to the electric scanning (main scanning) direction of the line sensor 210 at a speed v, and the mirrors 207 and 208 are mechanically moved in the same direction at a speed of (½)v, thereby scanning (sub-scanning) the entire original surface.

The signal processing unit 211 electrically processes the read image signal, separates the signal into magenta (M), cyan (C), yellow (Y), and black (Bk) components, and sends the components to the printer unit 202. One of the M, C, Y, and Bk components is sent to the printer unit 202 in every original scanning operation of the image scanner 201. With a total of four original scanning operations, i.e., once for each color component, one printout is complete.

The M, C, Y, and Bk image signals sent from the image scanner unit 201 are sent to a laser driver 212. The laser driver 212 modulates and drives a semiconductor laser 213 in accordance with the received image signals. A laser beam scans a photosensitive drum 217 through a polygon mirror 214, an f-θ lens 215, and a mirror 216.

A rotary developing device 218 comprises a magenta developing unit 219, a cyan developing unit 220, a yellow developing unit 221, and a black developing unit 222. The four developing units alternately contact the photosensitive drum 217 to develop an electrostatic image formed on the photosensitive drum 217 with toner.

A sheet supplied from a paper cassette 224 or 225 is wound on a transfer drum 223 so that the image developed on the photosensitive drum 217 is transferred to the sheet.

After the four color, i.e., M, C, Y, and Bk images are sequentially transferred, the sheet passes through a fixing unit 226 to fix the toner and is delivered.

With this arrangement, each of the color copying machines 120 and 121 not only functions as a normal color copying machine but also receives print data developed by the image processing apparatus 110, prints the data, and reports the state to the image processing apparatus. The color copying machine can also transmit an image read through the image scanner unit 201 to the image processing apparatus 110.

Host Computer

Figure 4:
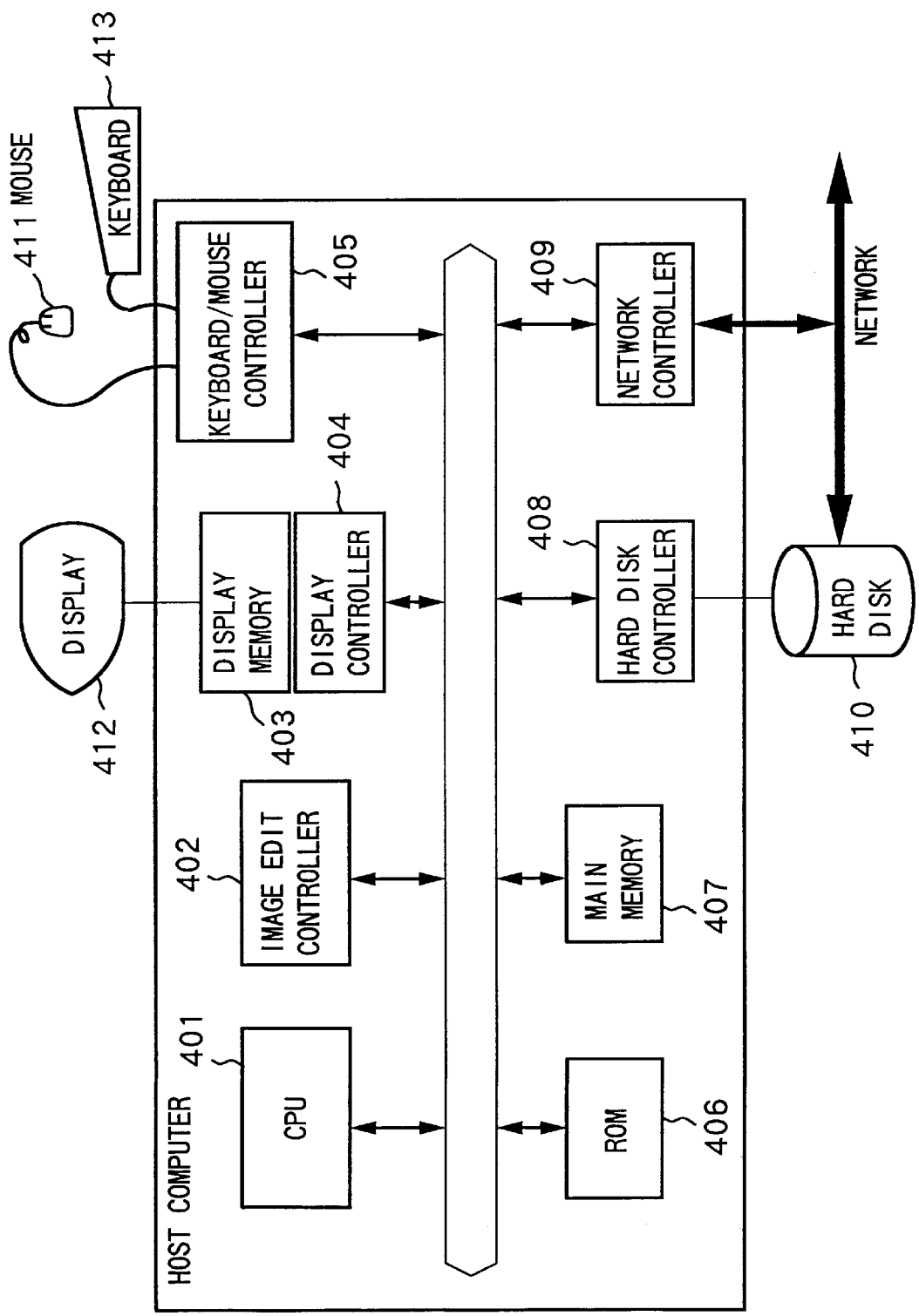
FIG. 4 is a block diagram showing the internal arrangement of a host computer.

FIG. 4 shows the arrangement of each of the host computers 101 to 103 on the network.

The host computer comprises a network controller 409 for controlling a protocol on the network, a CPU 401 for performing central control for the host computer in accordance with a program stored in a ROM 406 or a hard disk 410, the hard disk 410 for temporarily registering image data and storing various data, a hard disk controller 408 for controlling the hard disk 410, a main memory 407 for storing a program or data to be processed by the CPU 401, a mouse 411 and a keyboard 413 each serving as an input means for inputting an instruction from the operator, a keyboard/mouse controller 405 for controlling the mouse 411 and the keyboard 413, a color display 412 for displaying a layout/edit menu, a display memory 403, a display controller 404, and an image edit controller 402 for performing image layout/editing on the display memory 403.

The host computers 101 to 103 each having the above arrangement can prepare document data in accordance with the operation of the operator, or load natural image data or the like from the color copying machines 120 and 121 through the image processing apparatus 110. When data is to be printed, the host computer converts the data into predetermined PDL data and sends the PDL data to the image processing apparatus 110 as a print job.

Image Processing Apparatus

Figure 3:
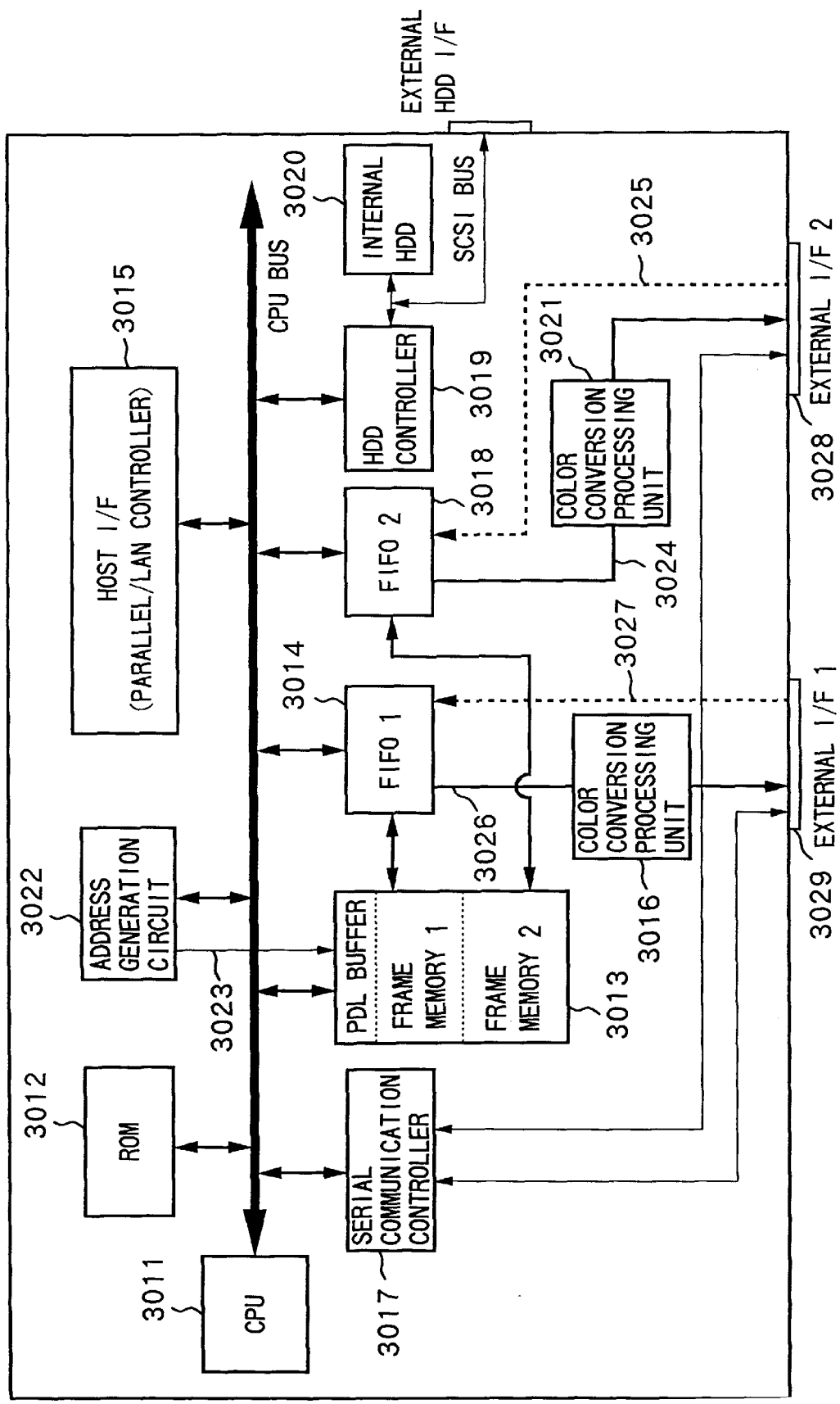
FIG. 3 is a block diagram showing the internal arrangement of an image processing apparatus according to the present invention.

FIG. 3 is a block diagram showing the internal arrangement of the image processing apparatus 110.

Referring to FIG. 3, a CPU 3011 controls the entire image processing apparatus on the basis of a program stored in a ROM 3012. The CPU 3011 must also perform image development processing of PDL data in parallel. For this reason, in this embodiment, a high-speed RISC (Reduced Instruction Set Computer)-CPU is used.

Output to Color Copying Machine

An arrangement for developing PDL data received from the host computer by the image processing apparatus 110 and outputting the developed data to the color copying machine as image data will be described.

In image development of PDL data, PDL data from the host computer is received through a host interface 3015 for controlling a parallel interface or a LAN interface as an interface to the host computer. At this time, the PDL data is sent from the host computer through the parallel interface or the LAN interface. Both interface cables can be connected. When a request from the host computers 101 to 103 is received, the interfaces are automatically switched.

The received PDL data is temporarily stored in a partial area (PDL buffer) of a DRAM 3013 through a CPU bus. The CPU 3011 develops the received PDL data into RGB raster image data using font data stored in the ROM 3012, or an internal HDD 3020 or an external HDD as a file storage unit. An address generation circuit 3022 generates a write address 3023 to frame memory 1 or 2 prepared in the DRAM 3013, so that the raster image data is stored at the address.

In this embodiment, to prepare image data to be printed by the two color copying machines 120 and 121 connected to the image processing apparatus 110, the image processing apparatus 110 has a software structure wherein two PDL developing tasks run in parallel. Accordingly, frame memories for storing image data, FIFOs serving as buffers for transmitting/receiving data to/from the color copying machines, and external I/Fs connected to the color copying machines are independently set for the two color copying machines in correspondence with the PDL developing tasks. Therefore, unlike the prior art, even when an engine error is generated in one color copying machine, the error state does not affect a print request for the other color copying machine.

The PDL developing tasks independently run for sets of PDL developing task+frame memory 1 (or frame memory 2)+FIFO 1 (or FIFO 2)+external I/F 1 (or I/F 2), as described above. For this reason, a description after FIG. 5 will be made only about one task except the case wherein an engine error is generated in the color copying machine. Each of the color copying machines 120 and 121 comprises a color electrophotographic copying machine for sequentially forming images of a plurality of output color components, i.e., cyan, magenta, yellow, and black components. For this reason, raster image data stored in the DRAM 3013 is temporarily stored in a FIFO 3014 such that the image data can be read out as image data synchronized with a synchronous signal (the synchronous signal is received through the external interface) from the color copying machine. The image data is sent from the FIFO 3014 to a color conversion processing unit 3016 and subjected to color conversion processing. More specifically, the raster image data constituted by red, green, and blue components is converted into raster image data comprising cyan, magenta, yellow, and black components so that the image can be printed by the color copying machine. The raster image data is sent to the color copying machine through an external I/F unit 3028 or 3029. Upon receiving the raster image data, the color copying machine forms an image on the basis of the raster image data.

Figure 5:
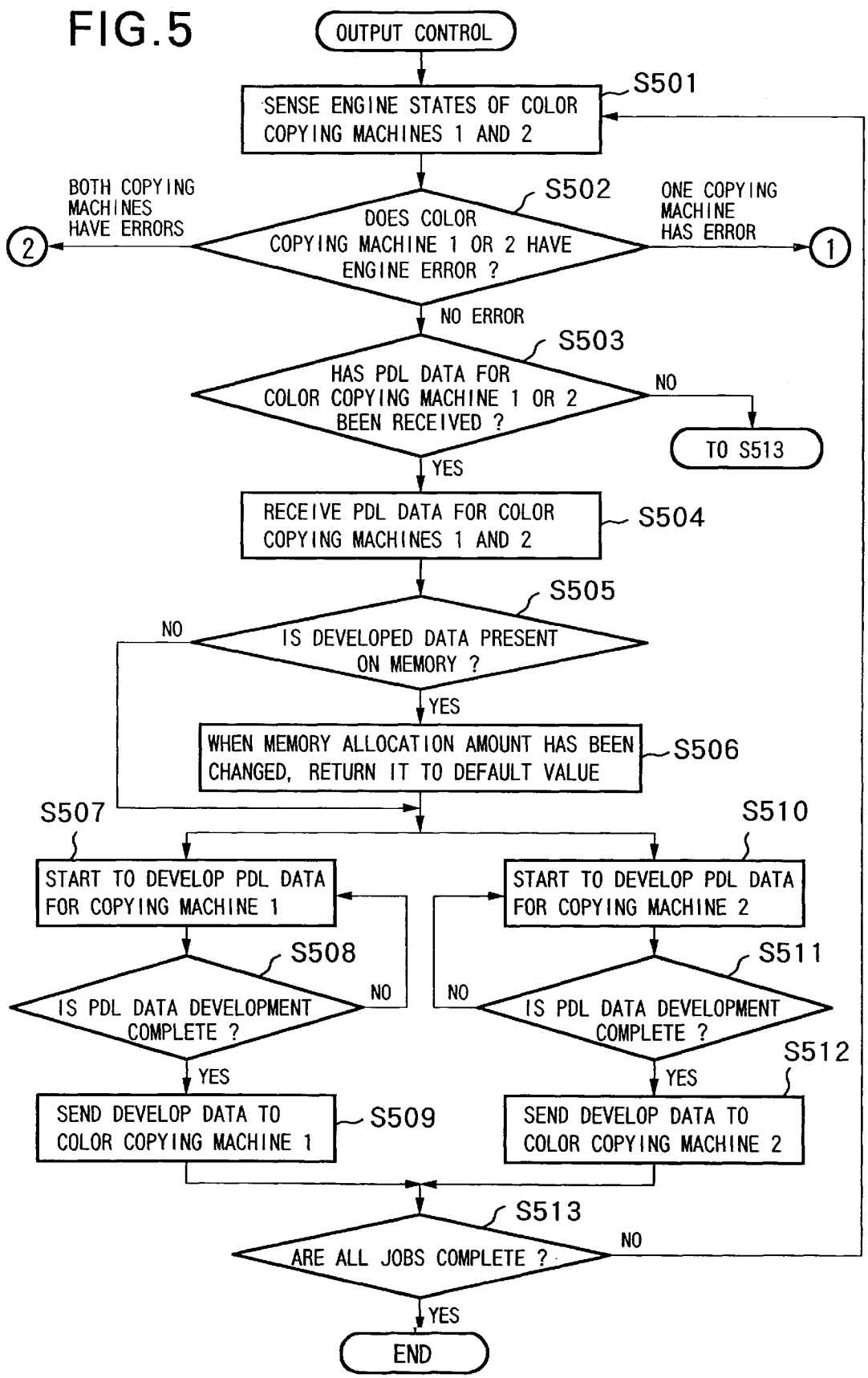
FIG. 5 is a flow chart for explaining control for an image processing apparatus of the first and second embodiments.

FIG. 5 is a flow chart showing a procedure of outputting image data from the image processing apparatus 110 to the color copying machine. The CPU 3011 executes a program stored in the ROM 3012, thus realizing this procedure. This procedure is started upon receiving a print job from the host computer.

In step S501, the states of the two color copying machines (to be referred to as color copying machines 1 and 2 hereinafter) connected to the image processing apparatus are sensed. It is checked in step S502 whether an engine error has been generated in color copying machine 1 or 2. An operation performed when an engine error is generated in one of the color copying machines, and an operation performed when engine errors are generated in both color copying machines will be described later with reference to FIGS. 6 and 7.

If it is determined in step S502 that neither color copying machines have engine errors, it is checked in step S503 whether PDL data for color copying machine 1 or/and 2 has been received, i.e., whether a data development request for the PDL developing task corresponding to each color copying machine is present. If YES in step S503, PDL data for color copying machine 1 or 2 is received in step S504.

It is checked in step S505 whether image data already developed on the frame memory is present. If YES in step S505, the flow advances to step S507 or S510 depending on the copying machine which is to output the PDL data to be developed, and subsequent processing is executed. If NO in step S505, the flow advances to step S506. If the memory allocation amount for each PDL developing task has been changed from a predetermined value (default value) in the previous processing, the memory amount is returned to the default value.

The default value may be determined on the basis of the printable resolution corresponding to each PDL developing task, the print mode (full color/monochrome), or the paper size supported by the color copying machine. Alternatively, the default value may be appropriately set by the operator.

The memory allocation amount is changed, e.g., when, in an image processing apparatus having a memory of, e.g., 256 MB (megabytes), PDL developing tasks corresponding to the color copying machines perform image development processing each using 128 MB in parallel. When one color copying machine cannot perform actual printing because of an engine error, the entire memory, i.e., 256 MB is allocated to the PDL developing task corresponding to the other color copying machine capable of printing, thereby giving priority to the image development of the task. Details of this case will be described later.

When PDL data for color copying machine 1 is received in step S504, processing in steps S505 and/or S506 is executed, and thereafter, the PDL developing task is started to develop the PDL data in steps 507 and S508. In step S509, the developed data is sent to color copying machine 1. The flow returns to step S501. It is determined in step S513 whether any job or jobs remains or remain unprocessed. If YES in step S513, processing from step S501 is repeated until all the jobs are complete.

When PDL data for color copying machine 2 is received in step S504, processing in steps S505 and/or S506 is performed, and thereafter, the PDL developing task is started to execute processing in steps S510 to S512. The processing contents are the same as those for color copying machine 1, and a detailed description thereof will be omitted. If PDL data for both color copying machines 1 and 2 are received, the PDL developing tasks for both color copying machines are started to perform parallel processing.

If PDL data are received for neither color copying machine 1 nor 2 in step S503, the flow branches to step S513. If it is determined in step S513 that any print job or jobs which has or have not been processed remains or remain, processing from step S501 is repeated.

Figure 6:
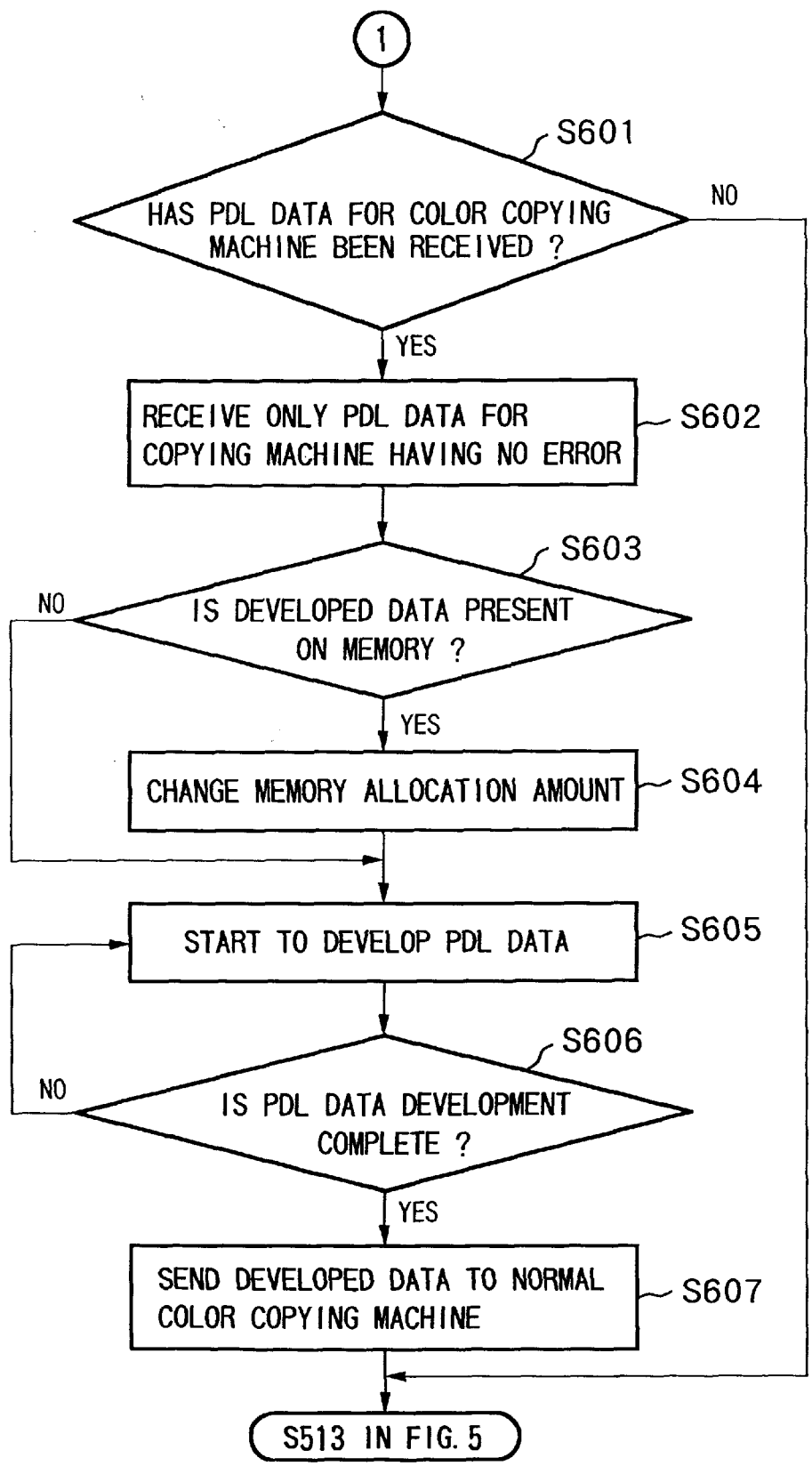
FIG. 6 is a flow chart for explaining control for the image processing apparatus of the first embodiment.

FIG. 6 will be described next. FIG. 6 shows a processing procedure executed when an engine error is detected in color copying machine 1 or 2 in step S502 shown in FIG. 5. This procedure will be described below in detail.

It is checked in step S601 whether PDL data for the color copying machines has been received. If YES in step S601, only PDL data for a color copying machine having no engine error is received in step S602. At this time, PDL data for a color copying machine having an engine error is not received.

It is checked in step S603 whether image data already developed on the memory is present. If YES in step S603, the flow advances to step S605 to execute subsequent processing. If NO in step S603, in step S604, the memory allocation amount is changed to allow the PDL developing task for the copying machine having no engine error, i.e., the copying machine capable of printing to use the entire frame memory. In steps S605 and S606, the memory allocated to the normal copying machine is used to develop the PDL data. In step S607, the developed data is sent to the color copying machine. Thereafter, the flow advances to step S513 in FIG. 5.

If NO in step S601, the flow advances to step S513 in FIG. 5.

Figure 7:
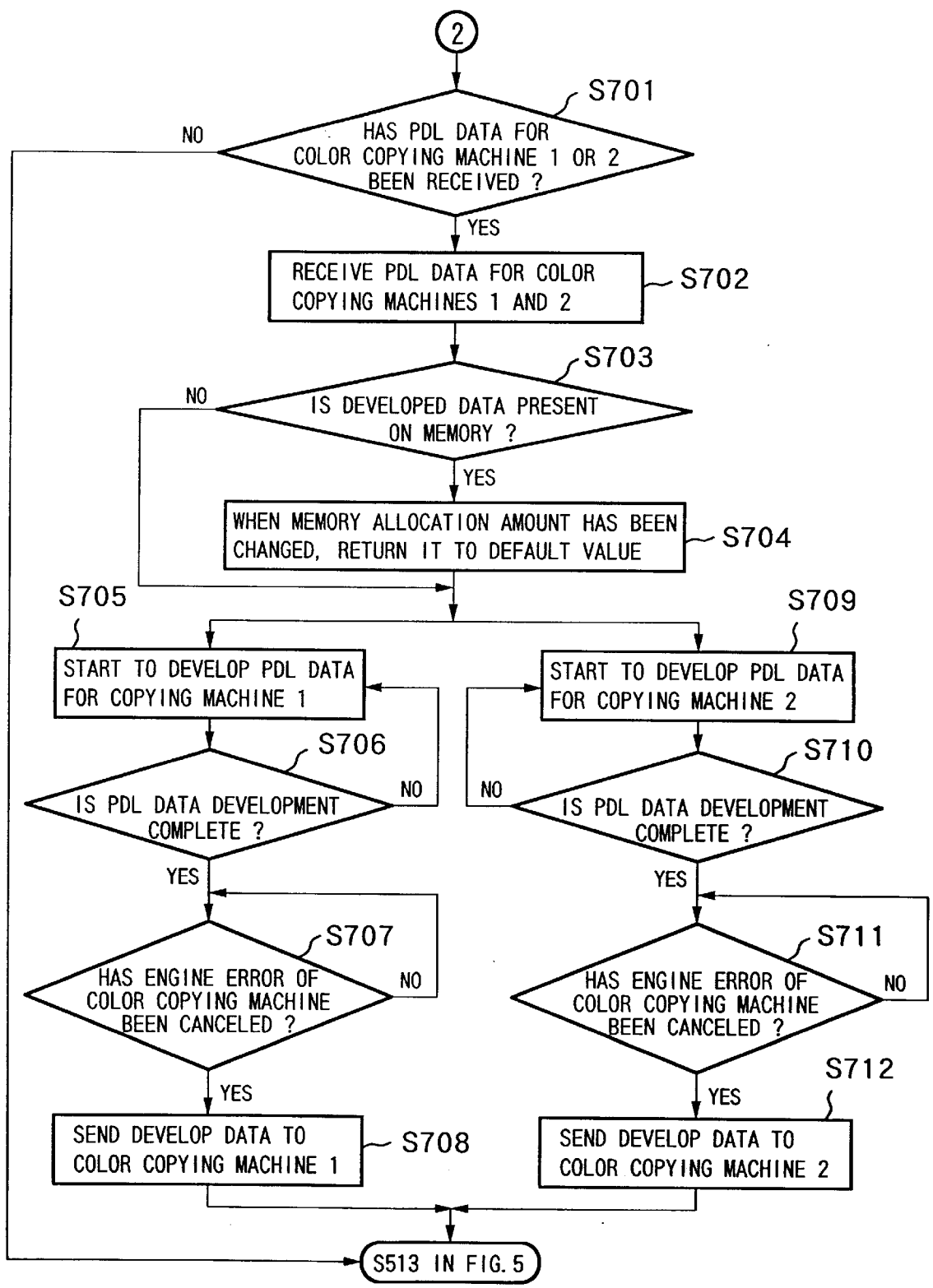
FIG. 7 is a flow chart for explaining control for an image processing apparatus of the first and third embodiments.

FIG. 7 will be described next. FIG. 7 shows processing performed when it is determined in step S502 in FIG. 5 that both color copying machines 1 and 2 have engine errors. This procedure will be described below in detail.

It is checked in step S701 whether PDL data for color copying machine 1 or 2 has been received. If YES in step S701, PDL data for color copying machine 1 or 2 is received in step S702.

It is checked in step S703 whether image data already developed on the memory is present. If YES in step S703, and the copying machine which is to print the image data is copying machine 1, the flow advances to step S705, and if the copying machine is copying machine 2, the flow advances to step S709 to execute subsequent processing. If NO in step S703, and the memory allocation amount for each PDL developing task has been changed from a predetermined value (default value) in the previous processing, the value is returned to the default memory allocation amount in step S704.

If PDL data for color copying machine 1 is received in step S702, processing in steps S703 and/or S704 is executed, and thereafter, the PDL developing task is started to develop the PDL data in steps S705 and S706. The processing waits until the engine error of color copying machine 1 is canceled in step S707. When the engine error is canceled, the developed data is sent to color copying machine 1 in step S708, and the flow advances to step S513. If PDL data for color copying machine 2 is received in step S702, processing in steps S703 and/or S704 is executed, and thereafter, the PDL developing task is started to execute processing in steps S709 and S710. When the engine error is canceled, the developed data is sent to color copying machine 2 in step S12.

If NO in step S701, the flow advances to step S513.

In the above way, the image processing apparatus 110 generates image data from PDL data.

In this system, the developed image data can be compressed and stored. In this case, the stored image data is read out and expanded.

Figure 8:
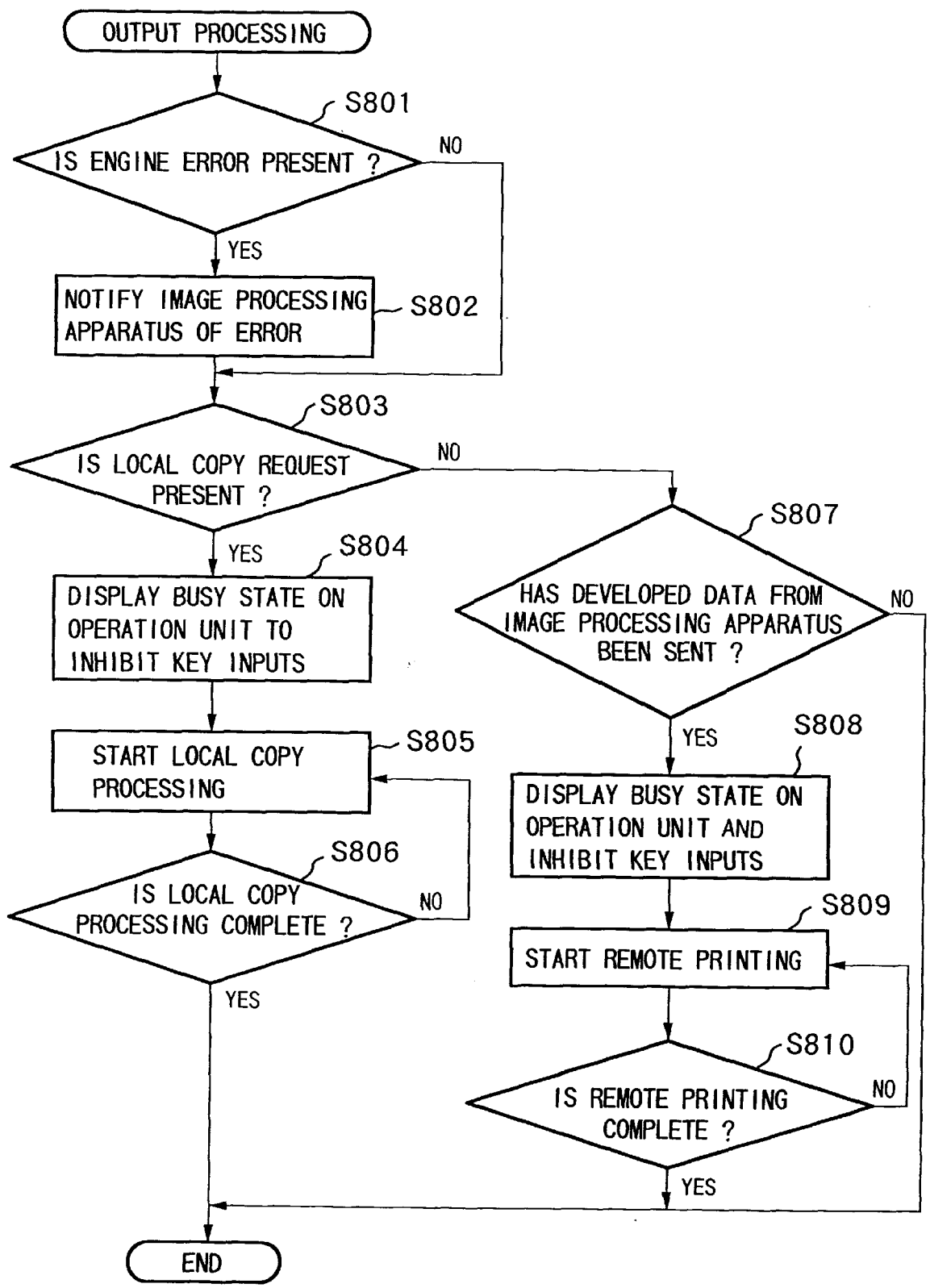
FIG. 8 is a flow chart for explaining control for a color copying machine of the first to third embodiments.

FIG. 8 is a flow chart of the output processing procedure of the color copying machines 120 and 121. In this embodiment, two color copying machines are used. The color copying machines themselves perform the same processing, and only processing of one color copying machine will be described. This procedure is executed when image data is received from the image processing apparatus 110, or a local copy request is issued.

It is checked in step S801 whether an engine error has been generated. If YES in step S801, the image processing apparatus 110 is notified of the error content in step S802. If NO in step S801, subsequent processing is performed. It is checked in step S803 whether a local copy request for reading an original from the scanner unit 201 of the copying machine itself and copying/outputting the image data from the printer unit 202 has been issued. If YES in step S803, a busy state is displayed on the copying machine operation unit in step S804, thereby inhibiting key inputs from the operation unit. The local copy processing is executed in steps S805 and S806. Upon completing the local copy processing, the processing is ended. If originals to be subjected to local copy processing remain, processing from step S801 is repeated.

If NO in step S803, it is checked in step S807 whether developed data has been sent from the image processing apparatus 110. If YES in step S807, a busy state is displayed on the copying machine operation unit in step S808, thereby inhibiting key inputs from the operation unit. In steps S809 and S810, remote printing for the received developed data is done. If NO in step S807, the processing is ended.

Input from Color Copying Machine

As described above, in the printing system of this embodiment, image data read from the image scanner unit 201 of the color copying machine can be output from the signal processing unit 211 to the image processing apparatus 110. In this case, the image data read from the scanner unit of the color copying machine is sent to the image processing apparatus 110 as multivalued bit map data in units of colors, i.e., red, green, and blue components and temporarily stored in the FIFO 3014 (or 3018) such that the image data can be read out in synchronism with a synchronous signal (not shown) from the image processing apparatus 110. The image data is stored in the frame memory 3013 on the basis of the synchronous signal. Thereafter, a read address 3023 is generated from the address generation circuit 3022 for the image data stored in the frame memory 3013, processing such as decimation is performed, and the image data is sent to the host computer 102 through the host interface 3015.

According to the system of this embodiment having the above arrangement, image data to be printed by the two copying machines are developed by independent PDL developing tasks. Therefore, any abnormality generated in one copying machine is prevented from affecting the other, so that printing by the normal copying machine is executed independently of the state of the other copying machine.

When one color copying machine cannot print because of some engine error, the PDL developing task for the other color copying machine having no engine error can use the entire memory incorporated in the image processing apparatus. More specifically, since a memory capacity larger than that in a normal state can be used, an improvement in performance of print processing using the normal copying machine can be expected.

Even when three or more copying machines are connected, output processing is controlled following the same procedure as described above. In this case, the storage areas allocated to normal copying machines may have an equal size or designated by the user. Alternatively, the memory allocation may be changed in accordance with the contents of print data.

Second Embodiment

The printing system of the second embodiment has the same arrangement as that of the first embodiment. The second embodiment is different from the first embodiment in the control procedure of the image processing apparatus, which is performed when an engine error is generated in one copying machine.

More specifically, the second embodiment is characterized in that, when one color copying machine cannot print because of some engine error, the memory capacity which can be used by the PDL developing task for the other copying machine having no engine error is increased from that in the normal state. However, the entire memory is not made usable, unlike the first embodiment.

With this arrangement, even when an engine error is generated in one color copying machine, the PDL developing task for the color copying machine having the error can develop image data although the performance slightly degrades because the usable memory capacity is smaller than that in the normal state. For this reason, after the engine error is canceled, printing can be immediately started using the developed data.

Nevertheless, the PDL developing task for the other color copying machine having no engine error can develop image data using a memory capacity larger than that in the normal state. Therefore, an improvement in performance can be expected on this task side.

Figure 9:
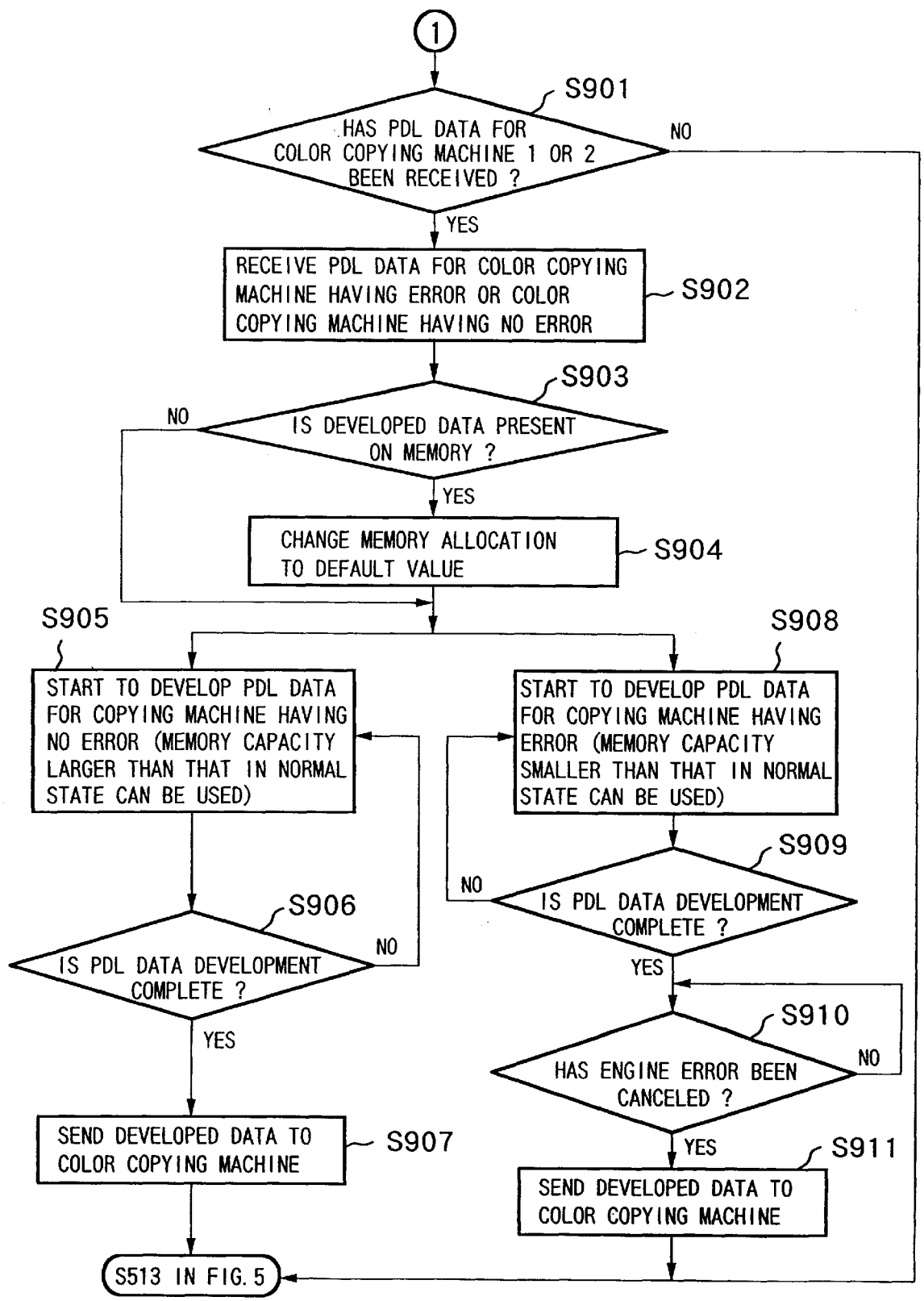
FIG. 9 is a flow chart for explaining control for the image processing apparatus of the second embodiment.

The system and the respective units are the same as those of the first embodiment. Only a control procedure corresponding to FIG. 6 is different from that described in the first embodiment. More specifically, when it is determined in step S502 in FIG. 5 that an engine error has been generated in one color copying machine, the flow branches to the flow chart shown in FIG. 9 in this embodiment. FIG. 9 representing the characteristic features of this embodiment will be described below in detail.

FIG. 9 is a control flow chart showing processing performed when the image processing apparatus determines in step S502 in FIG. 5 that color copying machine 1 or 2 has an engine error.

It is checked in step S901 whether PDL data for the color copying machines has been received. If YES in step S901, the PDL data for one copying machine having an engine error and the other color copying machine having no engine error are received in step S902.

It is checked in step S903 whether image data already developed on a frame memory 3013 is present. If YES in step S903, the flow advances to step S905 or S908 to execute subsequent processing. If NO in step S903, the memory allocation amount is changed. More specifically, the memory capacity which can be used by the PDL developing task corresponding to the copying machine having no engine error is increased, and at the same time, the memory capacity which can be used by the PDL developing task corresponding to the other copying machine having an engine error is decreased.

The memory allocation amount increased/decreased at this time may be determined in advance on the basis of the printable resolution, the print mode (full color/monochrome), and the paper size supported by each color copying machine, or appropriately set by the operator.

When PDL data for the copying machine having no engine error is received in step S902, processing in steps S903 and/or S904 is executed, and thereafter, the PDL developing task is started to develop image data using a larger memory capacity than that in the normal state in steps S905 and S906. The developed data is sent to the color copying machine in step S907, and the flow advances to step S513 in FIG. 5.

When PDL data for the copying machine having an engine error is received in step S902, the memory allocation amount is reduced in step S904. Therefore, the PDL developing task develops the image data using a memory capacity smaller than that in the normal state in steps S908 and S909, unlike data processing of the copying machine having no engine error. Thereafter, the processing waits in step S910 until the engine error is canceled. After the error is canceled, the developed data is sent to the color copying machine in step S911, and the flow advances to step S513 in FIG. 5.

The control flow chart (FIG. 8) of the color copying machine of this embodiment is the same as that of the first embodiment, and a detailed description thereof will be omitted.

With this arrangement, even when one color copying machine has an engine error, image development can be performed by the PDL developing task corresponding to the color copying machine having the error although the performance slightly degrades because the usable memory capacity becomes smaller than that in the normal state. Therefore, after the engine error is canceled, printing can be immediately commenced using the developed data.

Third Embodiment

The printing system of the third embodiment has the same arrangement as that of the first and second embodiments. The third embodiment is characterized in that, when one color copying machine cannot print because of some engine error, image development is performed even on the PDL developing task side corresponding to the copying machine having the error as much as possible without changing the memory capacity allocated in advance, unlike the second embodiment, and the developed data is stored in the memory and/or the HDD (when the data quantity is larger than the memory storage capacity). In this case, on the PDL developing task side corresponding to the copying machine having no engine error as well, image development is performed in parallel using the normally allocated memory.

Figure 10:
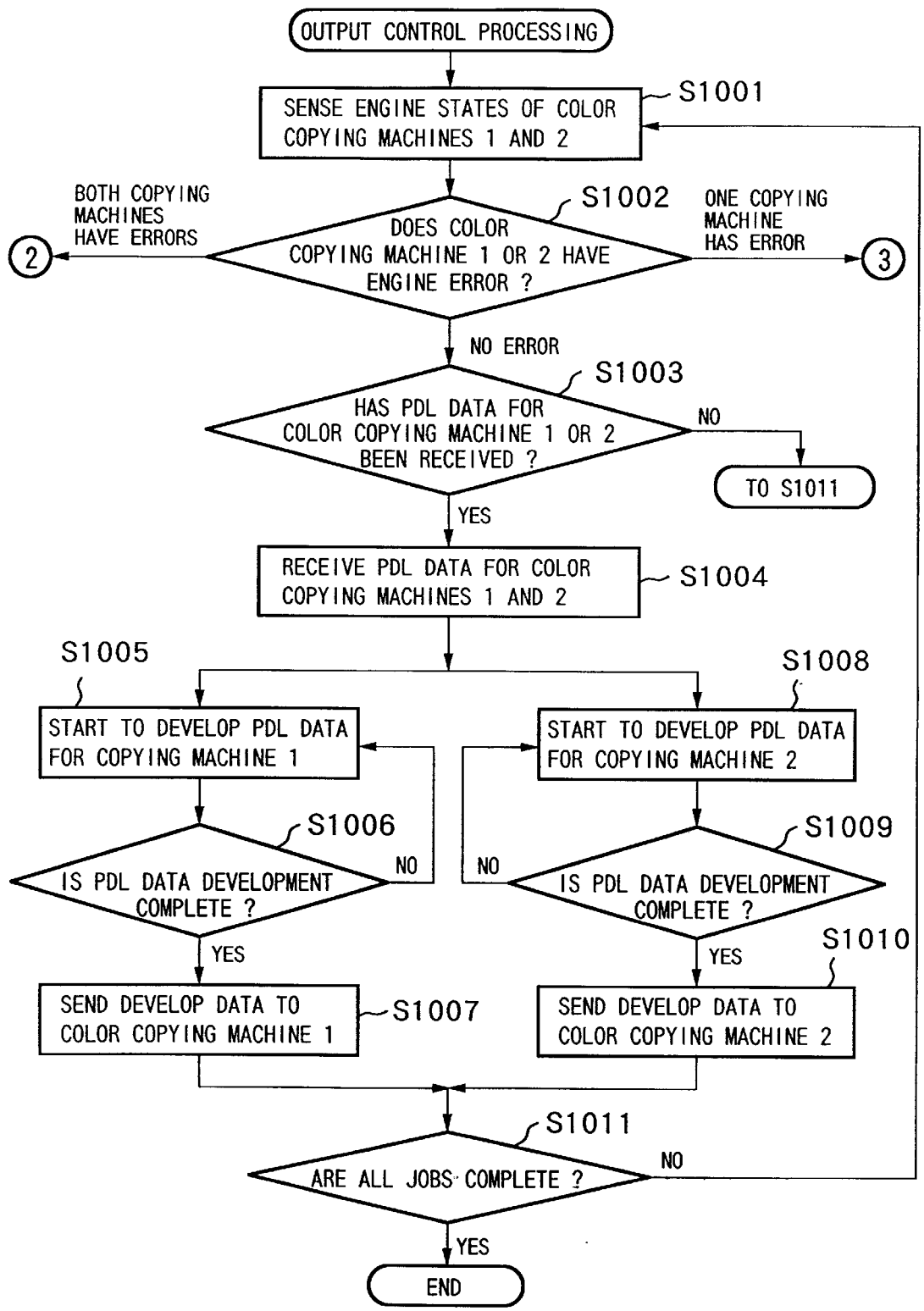
FIG. 10 is a flow chart for explaining control for the image processing apparatus of the third embodiment.
Figure 11:
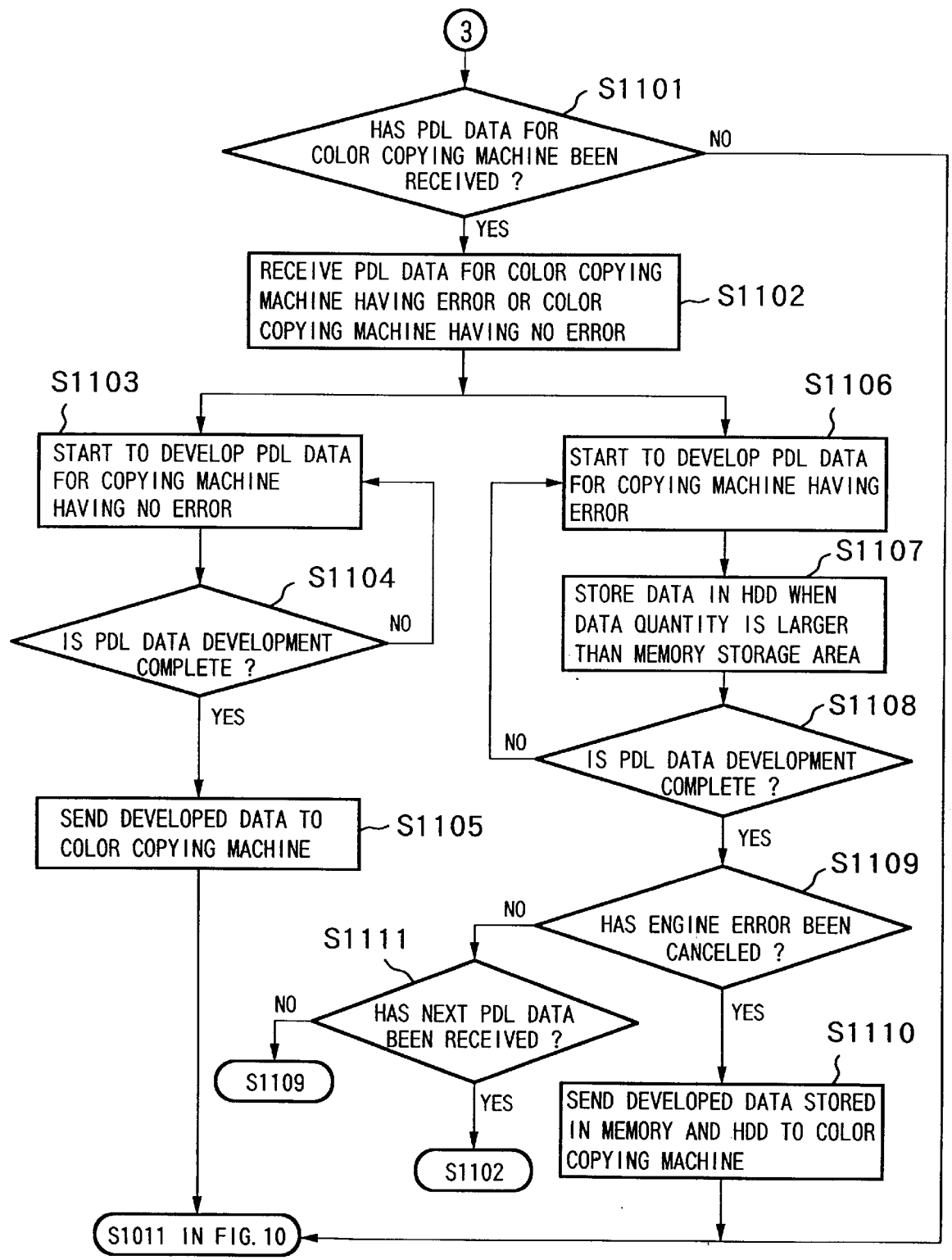
FIG. 11 is a flow chart for explaining control for the image processing apparatus of the third embodiment.

In addition to FIG. 7 (procedure performed when both copying machines have errors) described in the first embodiment, FIGS. 10 and 11 (FIGS. 10 and 11 show the characteristic features of this embodiment) show the control flow chart of the image processing apparatus of this embodiment. FIG. 7 has been described in the first embodiment, and a detailed description thereof will be omitted in this embodiment.

FIGS. 10 and 11 showing the characteristic features of this embodiment will be described below.

FIG. 10 shows processing which replaces FIG. 5 of the first and second embodiments. The conditional branch destination "1" (FIG. 6 or 9) in step S1002 is changed to "3" (FIG. 11). Since the memory allocation amounts for PDL developing tasks are not changed, steps corresponding to steps S505 and S506 are omitted. Except the above points, the processing is the same as that shown in FIG. 5, and a detailed description thereof will be omitted.

FIG. 11 is a control flow chart showing processing performed when an image processing apparatus 110 is notified of the presence of an engine error from color copying machine 1 or 2 in step S1001 in FIG. 10, and it is determined in step S1002 that one of the copying machines has an error.

In FIG. 11, it is checked in step S1101 whether PDL data for color copying machines has been received. If YES in step S1101, PDL data for one color copying machine having an engine error and PDL data for the other color copying machine having no engine error are received in step S1102.

When the PDL data for the copying machine having no engine error is received in step S1102, the PDL developing task is started to perform image development in steps S1103 and S1104. Thereafter, the developed data is sent to the color copying machine in step S1105. It is determined in step S1011 whether any job or jobs which has or have not been processed remains or remain. If YES in step S1011, the flow returns to step S1001.

When the PDL data for the copying machine having an engine error is received in step S1102, the PDL developing task is started to perform image development in steps S1106 to S1108. If the storage capacity of the internal memory, i.e., a DRAM 3013 for storing the developed image data does not suffice, the developed image data is stored in HDD 3020 in step S1107.

It is checked in step S1109 whether the engine error has been canceled. If YES in step S1109, the developed image data stored in the memory and the HDD is sent to the color copying machine in step S1110. If NO in step S1109, it is checked in step S1111 whether the next PDL data has been received. If YES in step S1111, the flow returns to step S1102 to repeat data reception. In this case, image development is performed until the engine error is canceled, and the developed image data is stored in the memory 3013 and/or the HDD 3020. When print data is prepared, as described above, printing can be immediately and continuously initiated after the error is canceled.

If NO in step S1111, the flow returns to step S1109 to execute subsequent processing.

The control flow chart (FIG. 8) of the color copying machine of this embodiment is the same as that of the first embodiment, and a detailed description thereof will be omitted.

With the above processing, in the printing system of this embodiment, image data can be developed from PDL data independently of whether an error is generated in the copying machine for outputting the image data, as in the normal state. When the copying machine recovers from the error, the image data can be immediately printed.

Image data for the color copying machine having an error is saved every time it is generated. Therefore, even for the copying machine having an error, print data issued for the copying machine is sequentially developed without any delay. As described above, in the printing system of this embodiment, the PDL developing tasks corresponding to the respective copying machines in the system are simultaneously run to perform parallel processing (PDL developing tasks are arranged in correspondence with the color copying machines). In addition, when an engine error is generated in one of the copying machines, the resource which can be used by the copying machine having an error is allocated to the PDL developing task corresponding to the other copying machine to increase the speed of the image development processing, so that printing can be performed at a high speed. Print data for the copying machine having an error is stored, so that printing can be started immediately after the error is canceled.

Fourth Embodiment

Figure 13:
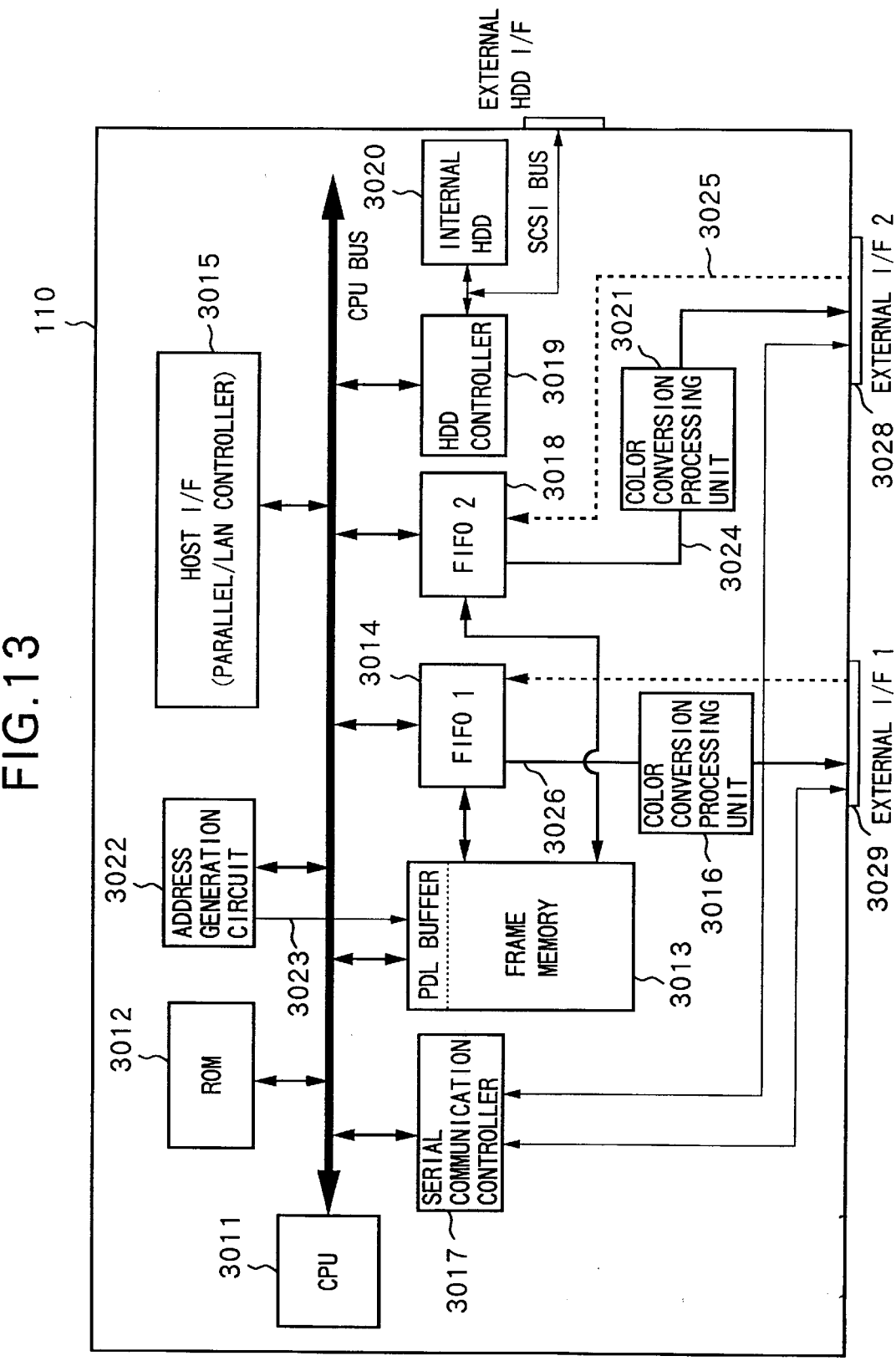
FIG. 13 is a block diagram showing the internal arrangement of an image processing apparatus.

FIG. 13 is a block diagram of an image processing apparatus used in a printing system according to the fourth embodiment. The arrangements of the host computer and the color copying machine are the same as those shown in FIGS. 4 and 2. FIG. 13 is different from FIG. 3 in that only one frame memory is allocated to a RAM 3013. This is because, in the image processing apparatus of this embodiment, only one PDL developing task runs at once. The remaining arrangements are the same as in FIG. 3, and a detailed description thereof will be omitted.

In the software structure of this embodiment, one PDL developing task runs. In addition, FIFOs and external I/Fs are independently set for the respective color copying machines. For this reason, as far as image data to be output to the color copying machines are prepared upon completing image development by the PDL developing tasks, the color copying machines can apparently operate in parallel.

Assume that image development for one color copying machine is ended, and the copying machine cannot print because of some engine error. In this case, since image development has already been ended, the image data is temporarily saved in the HDD or the like (the image data can be read out from the HDD and printed later, as a matter of course), and thereafter, the frame memory on which the image data is developed is released. The next print request is accepted, and image development and printing are performed using the released frame memory. With this arrangement, the color copying machines apparently operate in parallel although there is only one PDL developing task.

The above-described color copying machine (FIG. 2) comprises a color electrophotographic copying machine for sequentially forming images of a plurality of output color components, i.e., cyan, magenta, yellow, and black components. For this reason, raster image data stored in the DRAM 3013 is temporarily stored in a FIFO 3014 (or 3018) such that the image data can be read out in synchronism with a synchronous signal (not shown) from the color copying machine (FIG. 2). The image data is sent from the FIFO 3014 (or 3018) to a color conversion processing unit 3016 (or 3012) and subjected to color conversion processing. More specifically, the raster image data constituted by red, green, and blue components is converted into raster image data (cyan, magenta, yellow, and black components) so that the image can be printed by a color copying machine 120 or 121. The raster image data is sent to the color copying machine through a video I/F unit 3029 (or 3028). Simultaneously, the color copying machine forms an image on the basis of the raster image data.

Procedure of Image Development

Figure 14:
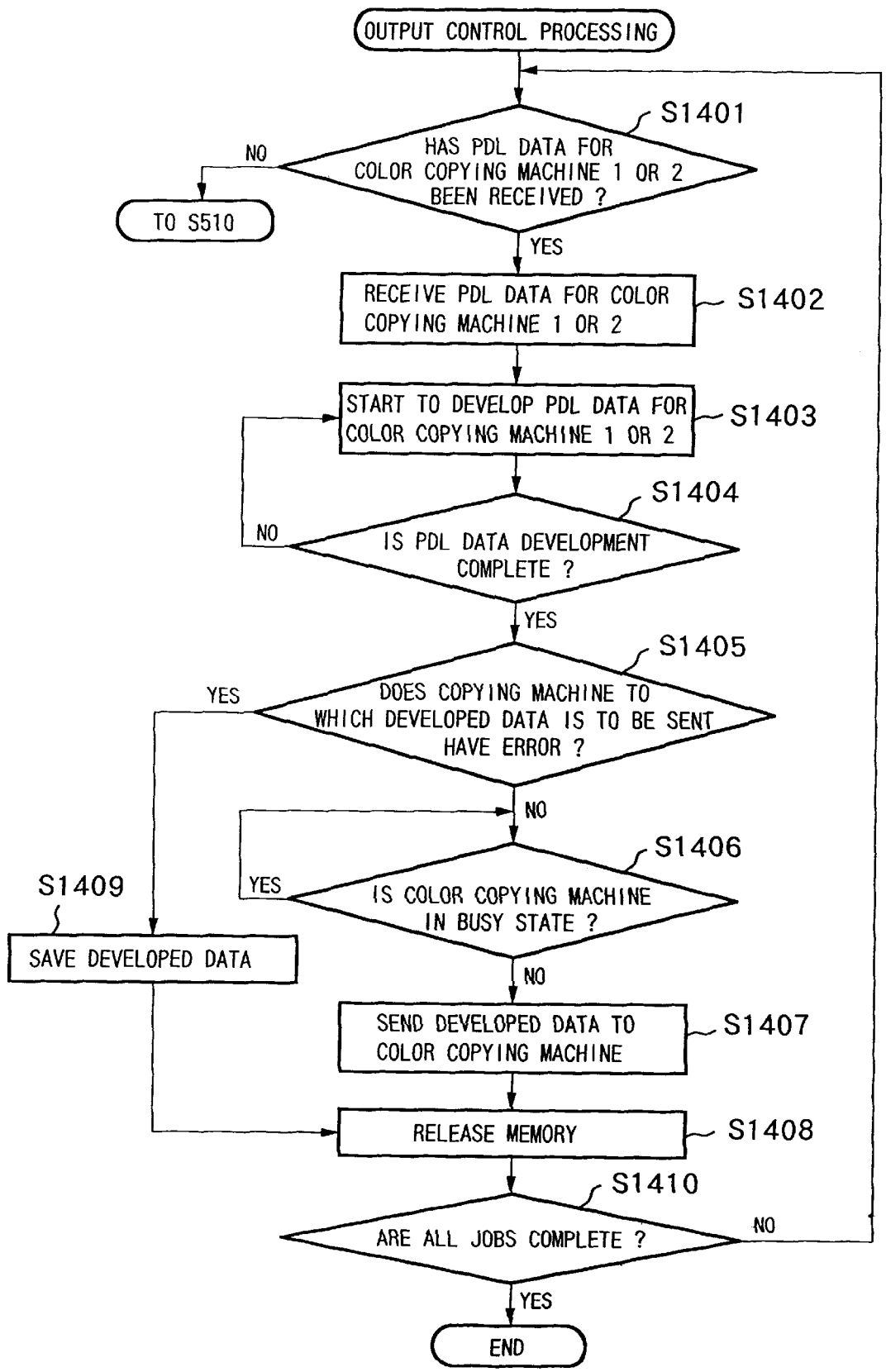
FIG. 14 is a flow chart for explaining control for an image processing apparatus of the fourth embodiment.

FIG. 14 is a flow chart for explaining the control flow of PDL data development and image output processing by the image processing apparatus 110 of this embodiment. This flow is executed upon receiving a print job from the host computer. This processing will be described below in detail with reference to the control flow chart.

It is checked in step S1401 whether PDL data for color copying machine 1 or 2 has been received. If YES in step S1401, the PDL data for color copying machine 1 or 2 is received in step S1402. In steps S1403 and S1404, the PDL data is developed into raster image data.

It is checked in step S1405 whether an engine error has been generated in the color copying machine to which the developed data is to be sent. Generation of an error can be determined in accordance with notification from the color copying machine. If NO in step S1405, it is checked in step S1406 whether the color copying machine is in a busy state, i.e., the color copying machine is performing local copy processing or remote printing. If YES in step S1406, the processing waits until the busy state is canceled.

In step S1407, the developed data is sent to the color copying machine. In step S1408, the frame memory 3013 is released to prepare for reception of the next PDL data, and the flow returns to step S1401.

If YES in step S1405, the developed data on the frame memory 3013 is saved to the HDD 3020 in step S1409. For this purpose, a "movement instruction" is issued to a developed data save task shown in FIG. 16 (to be described later). Upon completing save of the developed data, the flow advances to step S1408. In step S1408, the frame memory 3013 is released to prepare for reception of the next PDL data if all jobs are not complete yet. When all jobs are complete, the processing is temporarily ended to wait for input of a new job.

Figure 15:
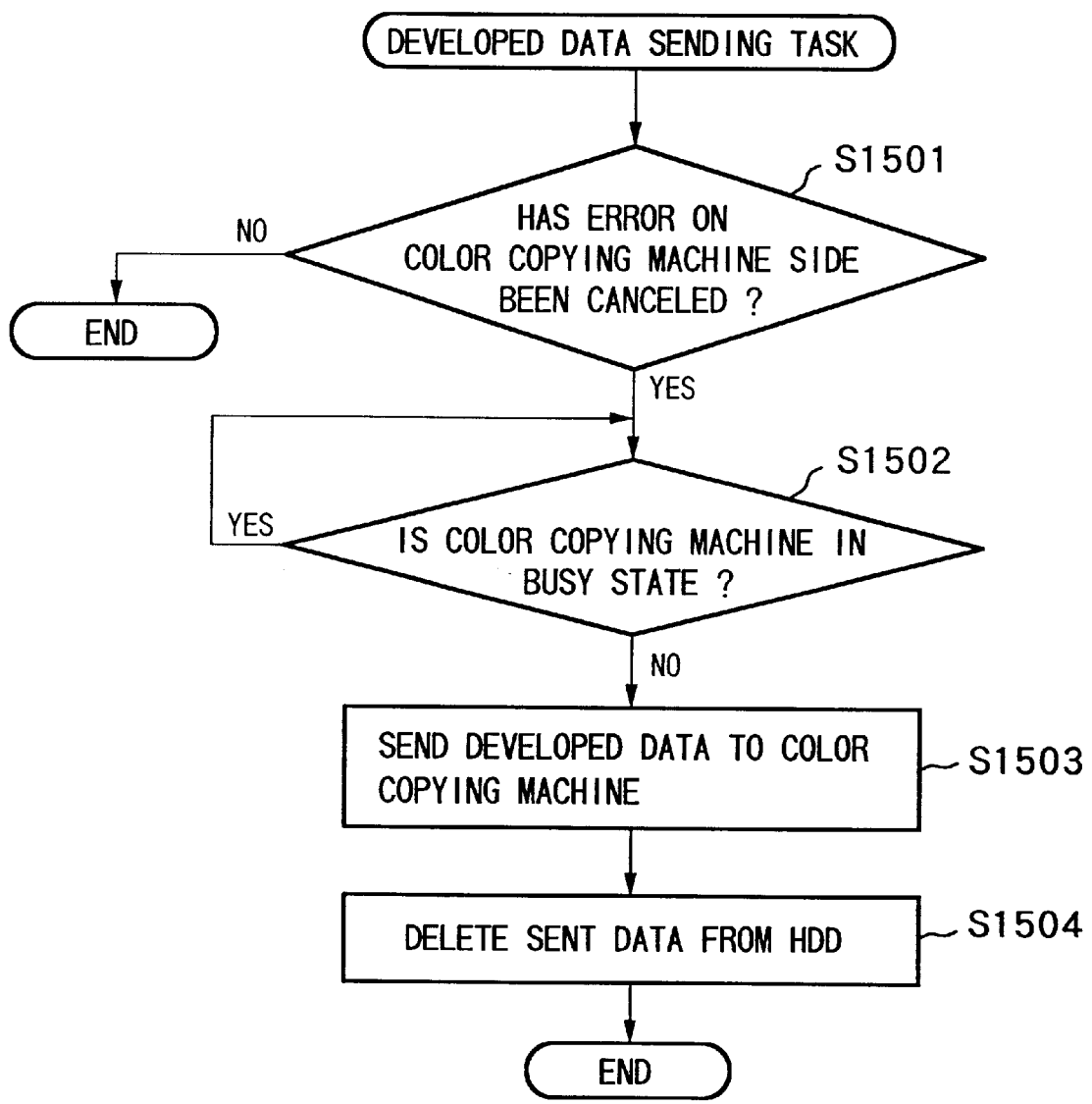
FIG. 15 is a flow chart for explaining control for the image processing apparatus of the fourth embodiment.
Figure 16:
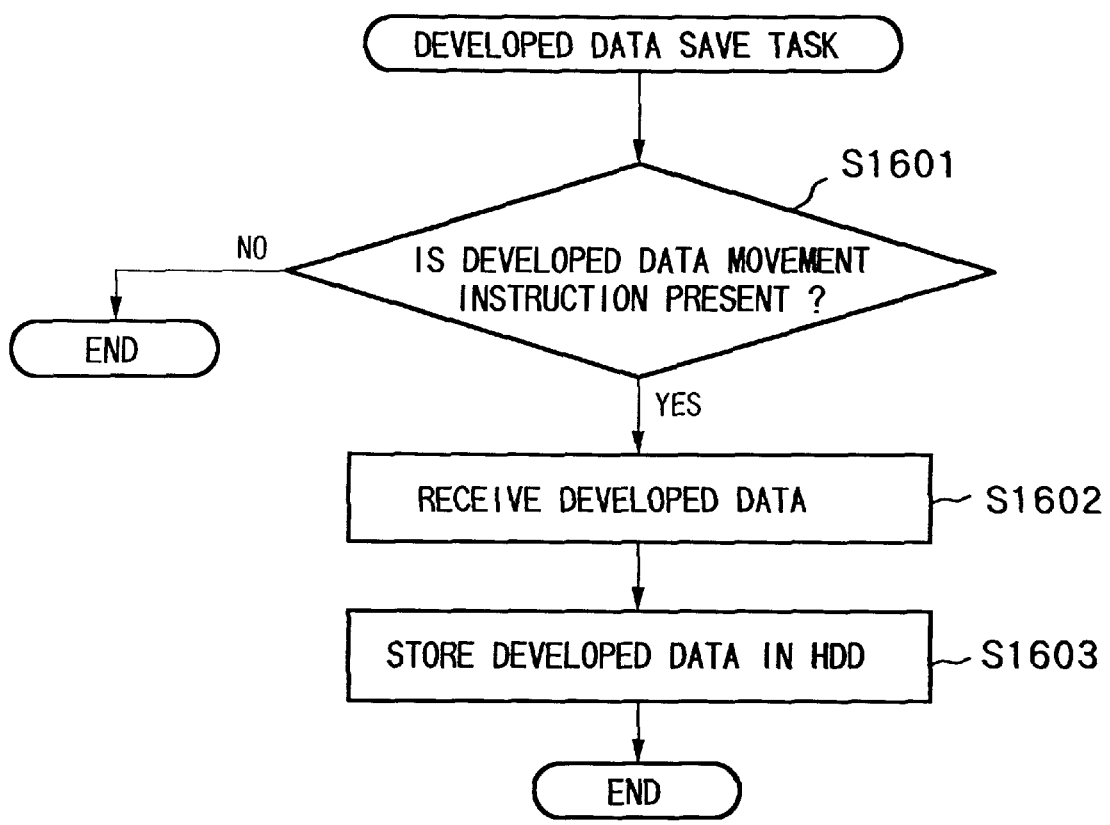
FIG. 16 is a flow chart for explaining control for the image processing apparatus of the fourth embodiment.

FIGS. 15 and 16 are flow charts for explaining subcontrol of this embodiment. The software of the image processing apparatus runs as so-called multitasks, so that a plurality of tasks apparently run in parallel. The main task control flow has been described in FIG. 14. In addition to the main task, the developed data sending task and the developed data save task to be described in FIGS. 15 and 16 run in parallel.

The developed data sending task shown in FIG. 15 will be described first. This task sends developed data which is temporarily saved to the HDD 3020 to the color copying machine. This task runs only when the developed data is saved to the HDD 3020.

It is checked in step S1501 whether the engine error of the color copying machine as the developed data sending destination has been canceled. If YES in step S1501, it is checked in step S1502 whether the color copying machine is in a busy state, i.e., the color copying machine is performing local copy processing or remote printing. If YES in step S1502, the processing waits until the busy state is canceled.

In step S1503, the developed data which is temporarily saved to the HDD is sent to the color copying machine. In step S1504, the sent developed data is deleted from the HDD, and the flow returns to step S1501.

This task may be started in an appropriate period before the main tack processing shown in FIG. 14 starts. Alternatively, this task may be started using, as a trigger, the first notification from the copying machine, which represents that the error of the color copying machine is canceled. When it is started in an appropriate period, as the task is not ended, the flow must repeatedly return to step S1501 to continuously monitor the state of the copying machine.

The developed data save task shown in FIG. 16 will be described next. When print data for the copying machine having an engine error is held on the frame memory of the image processing apparatus 110, the frame memory is occupied and cannot be used for subsequent PDL data development for the other copying machine. This task saves the developed data on the frame memory to the HDD, thereby releasing the frame memory.

It is checked in step S1601 whether a developed data movement instruction is present. If YES in step S1601, the developed data is received in step S1602, and stored in the HDD in step S1603.

This task may be started in an appropriate period before the main task processing shown in FIG. 14 starts.

Alternatively, the task may be started using the first movement instruction as a trigger.

As described above, when the color copying machine does not have an engine error, PDL data is received and developed. The main task for sending the developed data to the color copying machine and the tasks (developed data sending task and developed data save task) for temporarily saving the developed data to the HDD and sending the developed data after the engine error is canceled run in parallel. With this arrangement, even when image data to be output from one color copying machine is completely developed, and the copying machine cannot print because of some engine error, a print request from the host computer to the other color copying machine can be processed. The image data can be developed on the basis of the print request and printed by the copying machine having no engine error.

As a result, two PDL developing tasks apparently run in parallel although only one PDL developing task runs in fact. In addition, the frame memory may be prepared for one color copying machine.

Figure 17:
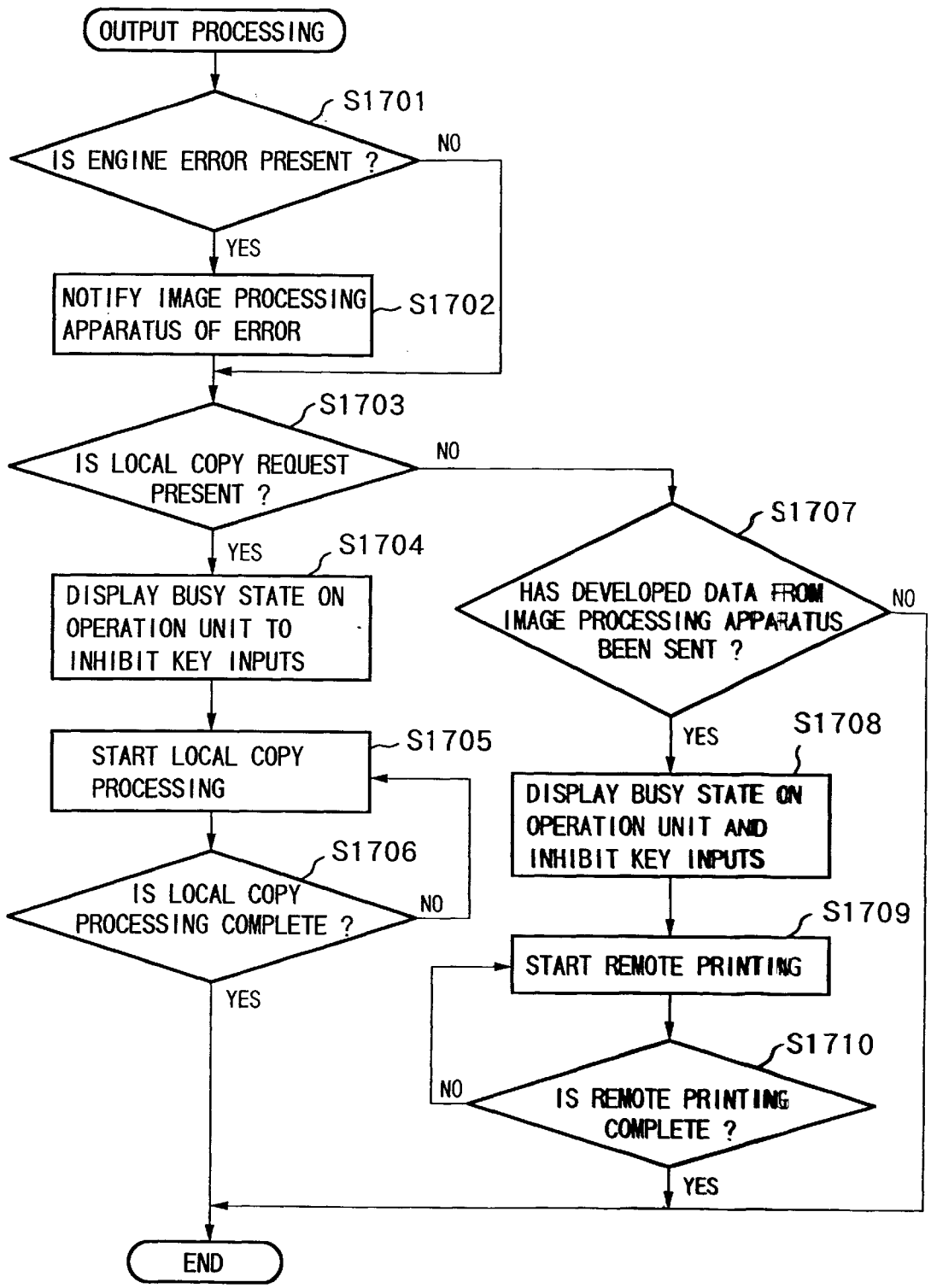
FIG. 17 is a flow chart for explaining control for color copying machine of the fourth embodiment.

FIG. 17 is a control flow chart of the color copying machine of this embodiment. This procedure is executed when a copy request or a print request is issued. In this embodiment, two color copying machines are used. The color copying machines themselves perform the same processing, and only processing of one color copying machine will be described.

It is checked in step S1701 whether an engine error has been generated. If YES in step S1701, the image processing apparatus is notified of the error content in step S1702. If NO in step S1701, the flow advances to subsequent processing. It is checked in step S1703 whether a local copy request has been issued. Local copy is a copy function as one original application of the color copying machine. If YES in step S1703, a busy state is displayed on the copying machine operation unit in step S1704, thereby inhibiting key inputs from the operation unit. In steps S1705 and S1706, local copy processing is executed.

If NO in step S1703, it is checked in step S1707 whether developed data has been sent from the image processing apparatus. If YES in step S1707, a busy state is displayed on the copying machine operation unit in step S1708, thereby inhibiting key inputs from the operation unit. In steps S1709 and S1710, remote printing is performed on the basis of the developed data. If NO in step S1707, the processing is ended. Every time an engine error is canceled, the image processing apparatus is notified of it.

With the above procedure, image data from the image processing apparatus is printed. The image processing apparatus is also notified of generation and cancel of errors.

Input from Color Copying Machine

Image data read from the scanner unit of the color copying machine is sent to the image processing apparatus as multivalued bit map data in units of three colors, i.e., red, green, and blue components and temporarily stored in the FIFO 3014 (or 3018) such that the image data can be read out in synchronism with a synchronous signal (not shown) from the image processing apparatus. A read address 3023 is generated from an address generation circuit 3022 for the image data stored in the frame memory 3013, processing such as decimation is performed, and the image data is sent to the host computer through the parallel interface.

With this arrangement, the host computer can cause the color copying machine not only to print an image but also to read an image.

With the above-described arrangement and procedure, in the image processing apparatus, method, and system of this embodiment, even when an error is generated in one copying machine, the other copying machine can print without any delay.

In addition, since PDL data to be printed by the copying machine having an error is developed into image data having a format to be printed by the copying machine, the copying machine can print without any delay after it recovers from the error.

Furthermore, since the frame memory corresponding to only one frame is used, the memory can be saved, and the image processing apparatus can manufactured at a low cost. This is particularly effective when the frame memory has a large capacity, e.g., when a high-resolution printer is used, a full-color printer is used, as in this embodiment, or a multivalued printer is used.

Furthermore, image data temporarily saved to the HDD or the like can be directly output to the image forming apparatus without being returned to the frame buffer, and output from the image forming apparatus.

Fifth Embodiment

The fifth embodiment is associated with a system having an arrangement shown in FIGS. 1, 2, 4, and 13, as in the fourth embodiment. This embodiment is characterized in that when one color copying machine cannot print an image because of some engine error, developed data on the frame memory is compressed and stored in the HDD.

With this arrangement, a large quantity of developed data can be saved using a small-capacity HDD. Accordingly, effects for the following cases can also be expected.

Assume that, in the system of the fourth embodiment, an engine error is not canceled for a long time. When the host computer continuously requests the color copying machine having an error to print without knowing the engine error, the HDD and the frame memory are gradually occupied. Eventually, no more storage capacity is available to save developed image data, so the contents in the frame memory cannot be saved. As a result, the frame memory is full, and PDL data for the color copying machine having no error cannot be developed. However, with the arrangement of the fifth embodiment, such a risk can be avoided to some extent.

Figure 18:
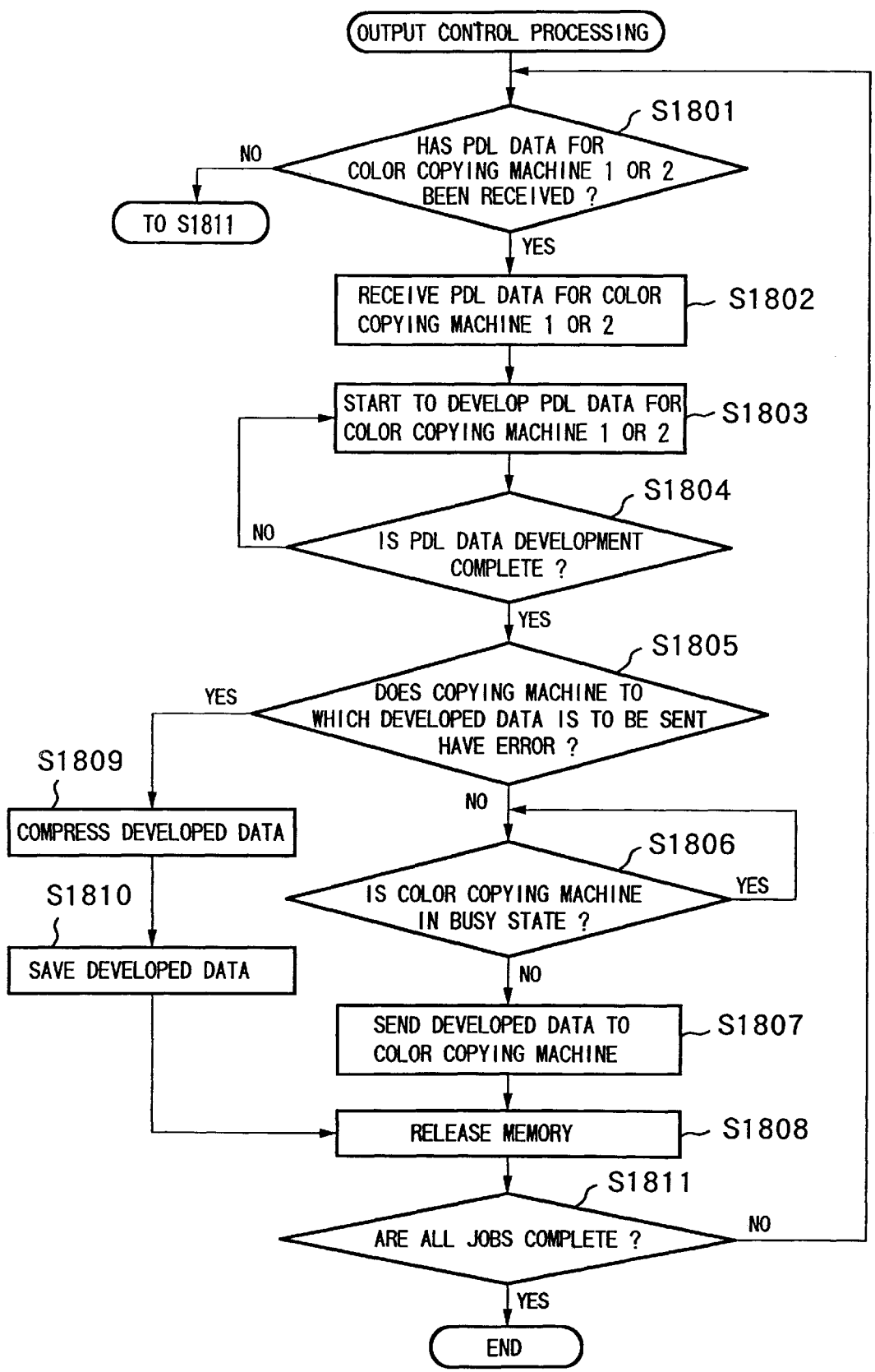
FIG. 18 is a flow chart for explaining control for an image processing apparatus of the fifth embodiment.

FIG. 18 is a control flow chart of the image processing apparatus of this embodiment. FIG. 18 is a flow chart for explaining the main control flow of the image processing apparatus of this embodiment. The flow will be described below in detail with reference to the control flow chart.

It is checked in step S1801 whether PDL data for color copying machine 1 or 2 has been received. If YES in step S1801, the PDL data for color copying machine 1 or 2 is received in step S1802. In steps S1803 and S1804, the PDL data is developed.

It is checked in step S1805 whether an engine error has been generated in the color copying machine to which the developed data is to be sent. If NO in step S1805, it is checked in step S1806 whether the color copying machine is in a busy state, i.e., the color copying machine is performing local copy processing or remote printing. If YES in step S1806, the processing waits until the busy state is canceled.

In step S1807, the developed data is sent to the color copying machine. In step S1808, the frame memory is released. If all jobs are not complete, processing prepares for reception of the next PDL data.

If YES in step S1805, the developed data is compressed in step S1809, and the compressed data is saved to an HDD

3020 in step S1810. In step S1808, the frame memory is released, and processing prepares for reception of the next PDL data.

As described above, this procedure is obtained by adding developed data compression processing in step S1809 to the procedure shown in FIG. 14.

Figure 19:
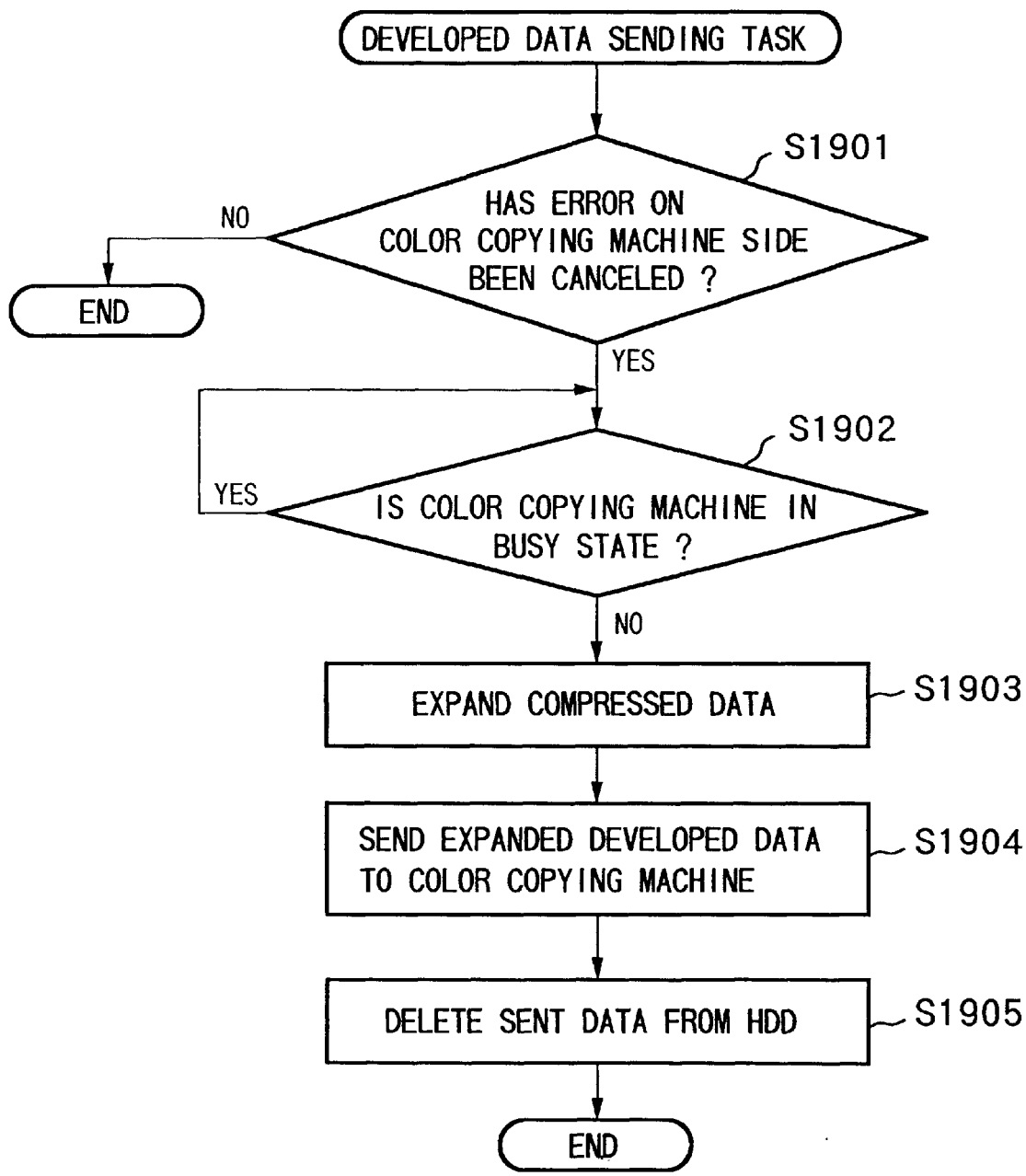
FIG. 19 is a flow chart for explaining control for the image processing apparatus of the fifth embodiment.

FIG. 19 is a flow chart for explaining control of the developed data sending task of this embodiment. The software of the image processing apparatus runs as so-called multitasks, so that a plurality of tasks apparently run in parallel. The main task control flow has been described in FIG. 18. In addition to the main task, the developed data sending task to be described in FIG. 19 and the developed data save task described in FIG. 16 run in parallel.

The developed data sending task will be described first. This task expands developed data which is temporarily saved to the HDD 3020 and sends the data to the color copying machine. This task runs only when the developed data is saved to the HDD.

It is checked in step S1901 whether the engine error of the color copying machine as a developed data sending destination has been canceled. If YES in step S1901, it is checked in step S1902 whether the color copying machine is in a busy state, i.e., the color copying machine is performing local copy processing or remote printing. If YES in step S1902, the processing waits until the busy state is canceled.

In step S1903, the compressed data stored in the HDD 3020 is expanded. In step S1904, the expanded developed data is sent to the color copying machine. In step S1905, the sent developed data is deleted from the HDD, and the flow returns to step S1901.

The developed data save task and the control flow chart (FIG. 17) of the color copying machine of this embodiment are the same as those of the fourth embodiment, and a detailed description thereof will be omitted.

Compression of the developed data may be performed by the developed data save task shown in FIG. 16, or expansion of the developed data may be performed by the main task.

With the above-described procedure of saving data on the frame memory, in the image processing apparatus, method, and system of this embodiment, even when an error is generated in one copying machine, the other copying machine can print without any delay.

In addition, since PDL data to be printed by the copying machine having an error is developed into image data having a format to be printed by the copying machine and saved, the copying machine can print without any delay after it recovers from the error.

Furthermore, since the frame memory corresponding to only one frame is used, the memory can be saved, and the image processing apparatus can be manufactured at a low cost. This is particularly effective when the frame memory has a large capacity, e.g., when a high-resolution printer is used, a full-color printer is used, as in this embodiment, or a multivalued printer is used.

In addition, since the developed data to be saved is compressed, a larger quantity of developed data can be stored in a disk.

Sixth Embodiment

The sixth embodiment is associated with a system having an arrangement shown in FIGS. 1, 2, 4, and 13, as in the fourth embodiment. The system of this embodiment is characterized in that when one color copying machine cannot print an image because of some engine error, a PDL intermediate data generated from PDL data is saved to a specific area of the frame memory or the HDD, unlike the fourth and fifth embodiments. When the engine error is canceled, image development is performed on the basis of the PDL intermediate data, and printing is performed.

With this arrangement, a larger quantity of image data can be saved as compared to the fifth embodiment.

In some cases, it is more efficient to develop an image from PDL intermediate data on the frame memory and transfer the developed data to the color copying machine than to read out compressed data saved to the HDD, expand the data, and transfer the data to the color copying machine, as in the fifth embodiment. Therefore, when the PDL intermediate data is saved to a specific area on the frame memory, an improvement in performance can be expected.

Figure 20:
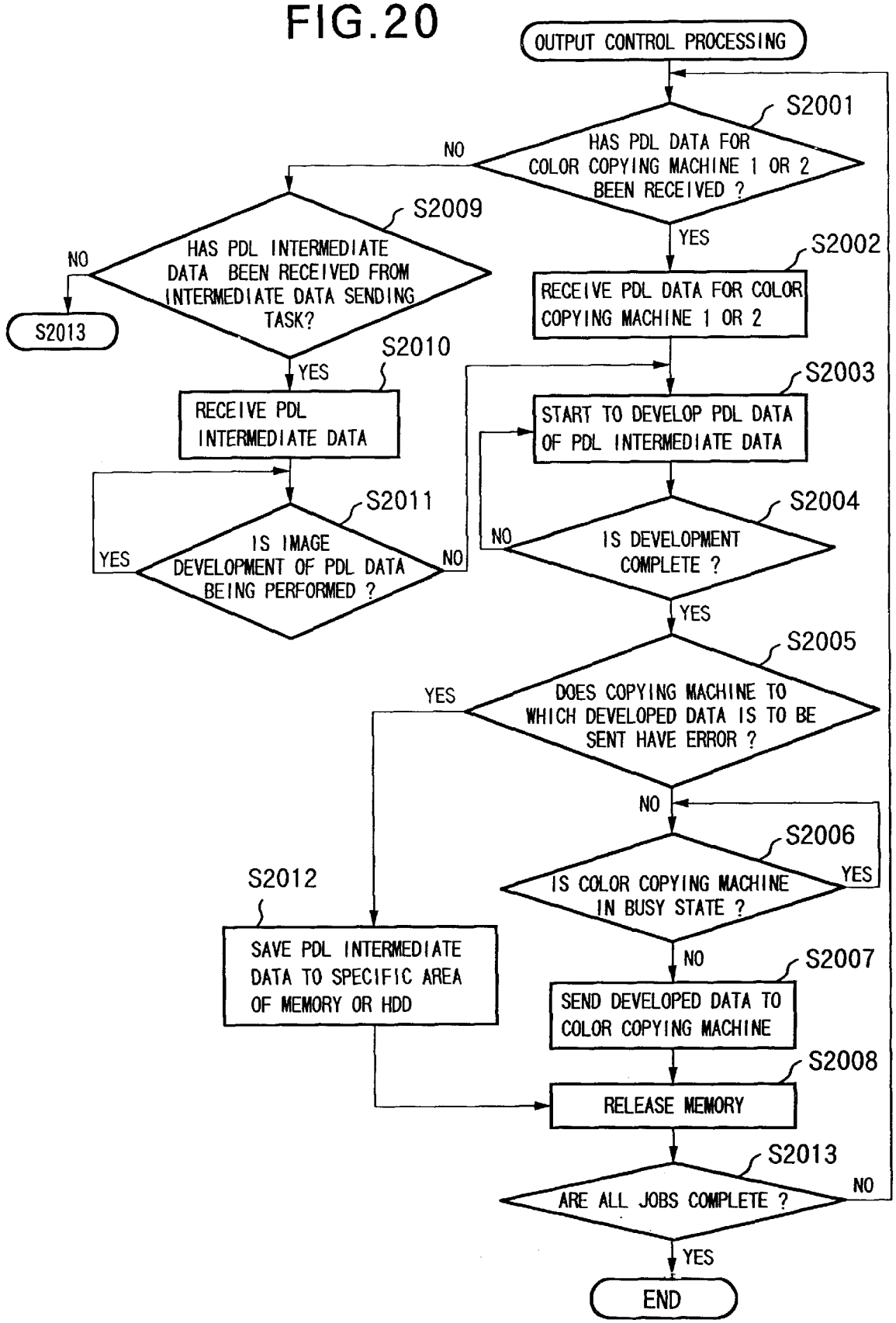
FIG. 20 is a flow chart for explaining control for an image processing apparatus of the sixth embodiment.

FIG. 20 is a control flow chart of the image processing apparatus of this embodiment. FIG. 20 is a flow chart for explaining the main control flow of the image processing apparatus of this embodiment. The flow will be described below in detail with reference to the control flow chart.

It is checked in step S2001 whether PDL data for color copying machine 1 or 2 has been received. If YES in step S2001, the PDL data for color copying machine 1 or 2 is received in step S2002. In steps S2003 and S2004, the PDL data or PDL intermediate data (to be described below) is developed. The data developed at this time is PDL image data received from the host computer or PDL intermediate data sent from the intermediate data sending task (to be described later) to the main task. The PDL intermediate data is directly developed into raster image data. However, the PDL data is temporarily converted into PDL intermediate data and then into raster image data. The PDL intermediate data generated at this time is not deleted because it may be saved in step S2012.

It is checked in step S2005 whether an engine error has been generated in the color copying machine to which the developed data is to be sent. If NO in step S2005, it is checked in step S2006 whether the color copying machine is in a busy state, i.e., the color copying machine is performing local copy processing or remote printing. If YES in step S2006, the processing waits until the busy state is canceled.

In step S2007, the developed data is sent to the color copying machine. In step S2008, the frame memory is released, and the flow returns to step S2001 to prepare for reception of the next PDL data.

If YES in step S2005, PDL intermediate data generated from the PDL data of a print job to be printed is moved to a specific area of a frame memory 3013 or an HDD 3020 in step S2012. In step S2008, the frame memory is released to prepare for reception of the next PDL data.

The PDL intermediate data corresponds to data obtained by converting object description in units of pages into object description in units of bands formed upon dividing a page, or data having a common format generated for emulation of a plurality of printers. The PDL intermediate data is data between the received PDL data and bit map (print) data generated upon performing image development based on the PDL data.

In terms of data characteristic, image development from PDL intermediate data is more efficient and speedy than image development from PDL data. As for the data sizes, PDL data<intermediate data<<bit map (print) data holds. As PDL intermediate data has a much smaller size than that of bit map data, the PDL intermediate data is suitable for data storage and image development.

If NO in step S2001, it is checked in step S2009 whether PDL intermediate data has been sent from the intermediate data sending task (to be described below). If YES in step S2009, the PDL intermediate data is received in step S2010. It is checked in step S2011 whether PDL data is currently being developed, and the processing waits until the image development is complete. When the image development is complete, subsequent processing from step S2003 is executed on the basis of the PDL intermediate data.

In the above manner, when PDL intermediate data is sent, the same effect as in the fourth embodiment can be obtained. In addition, the quantity of data to be saved becomes small. For this reason, even when an error is generated in the printing unit of the copying machine in outputting a print job for a large data quantity, the risk that the data cannot be completely saved can be minimized.

Figure 21:
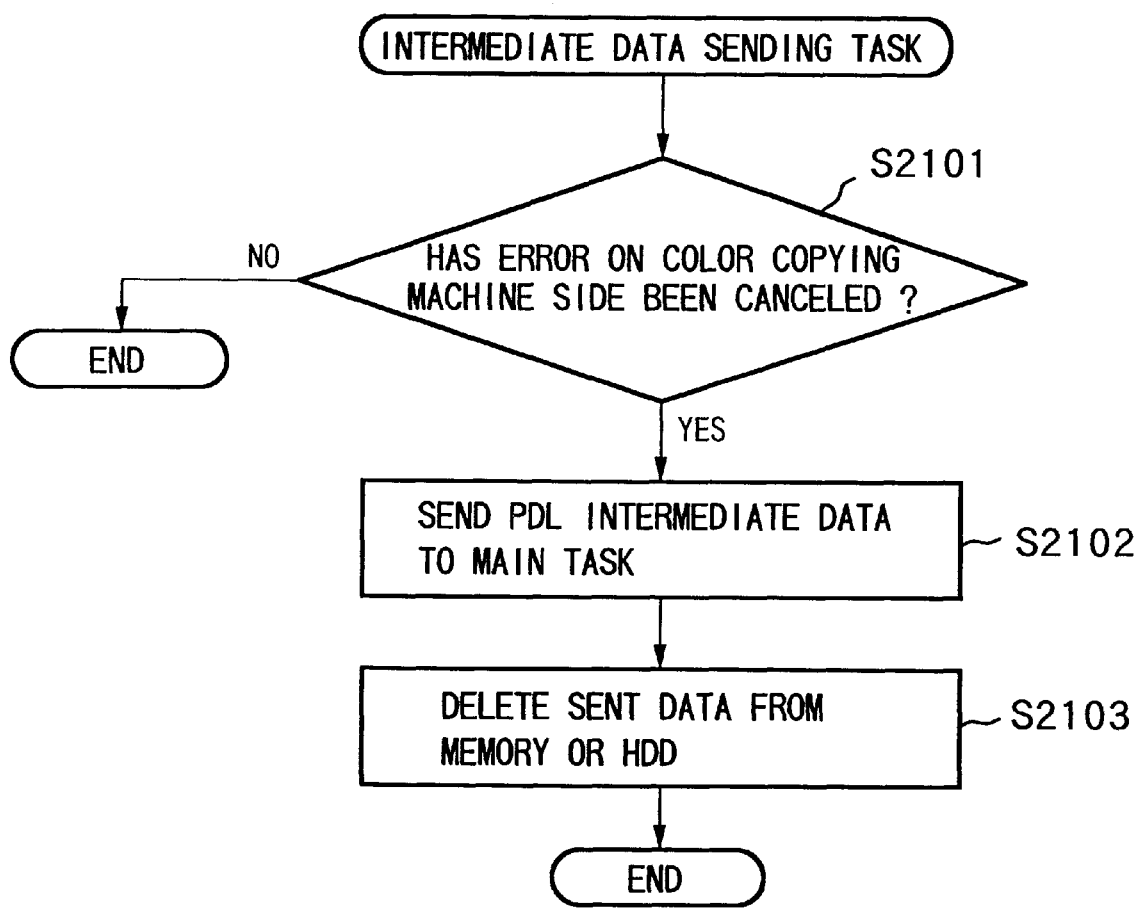
FIG. 21 is a flow chart for explaining control for the image processing apparatus of the sixth embodiment.
Figure 22:
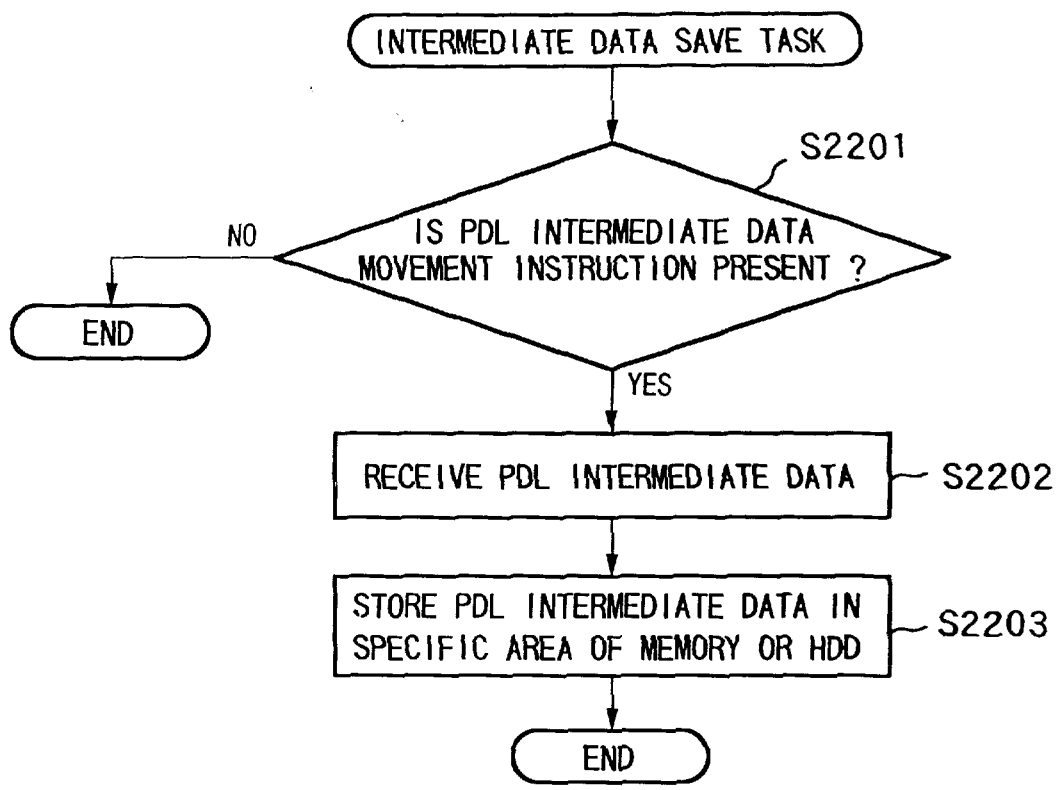
FIG. 22 is a flow chart for explaining control for the image processing apparatus of the sixth embodiment.

FIGS. 21 and 22 are flow charts for explaining subcontrol of this embodiment. The software of the image processing apparatus runs as so-called multitasks, so that a plurality of tasks apparently run in parallel. The main task control flow has been described in FIG. 20. In addition to the main task, the intermediate data sending task and the intermediate data save task to be described in FIGS. 21 and 22 run in parallel.

The intermediate data sending task will be described first. This task sends PDL intermediate data which is temporarily saved into a specific area of the frame memory or the HDD to the main task. This task runs only when the intermediate PDL data is saved to a specific area of the frame memory or the HDD.

It is checked in step S2101 whether the engine error of the color copying machine has been canceled. If YES in step S2101, the PDL intermediate data stored in a specific area of the frame memory or the HDD 3020 is sent to the main task in step S2102. In step S2103, the sent PDL intermediate data is deleted from the frame memory or the HDD.

The intermediate data save task will be described next. This task saves PDL intermediate data as the base of image development to a specific area of the frame memory or the HDD because PDL data from which a copying machine can develop an image while print data for the other color copying machine having an engine error is held on the frame memory.

It is checked in step S2201 whether a PDL intermediate data movement instruction is present. If YES in step S2201, the PDL intermediate data is received in step S2202. In step S2203, the PDL intermediate data is stored in a specific area of the frame memory 3013 or the HDD 3020. The control flow chart (FIG. 17) of the color copying machine of this embodiment is the same as in the fourth embodiment, and a detailed description thereof will be omitted.

As described above, in the system of this embodiment, when one color copying machine has an error, data to be printed by the copying machine is stored as PDL intermediate data, and image development/output processing is continued. For this reason, the other copying machine can start printing without any delay.

In addition, PDL data to be printed by the color copying machine having an error is saved as PDL intermediate data which has a small quantity and can be quickly developed into raster image data. For this reason, the color copying machine can print without any delay after it recovers from the error.

Furthermore, since the frame memory corresponding to only one frame is used, the memory can be saved, and the image processing apparatus can be manufactured at a low cost.

In addition, since the developed data to be saved is PDL intermediate data, a larger quantity of image data can be stored in a disk.

Other Embodiments

The present invention can be applied to a system constituted by a plurality of devices (e.g., a host computer, an interface device, a reader, a printer, and the like), or to an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the program codes read out by the computer are executed but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Figure 12A:
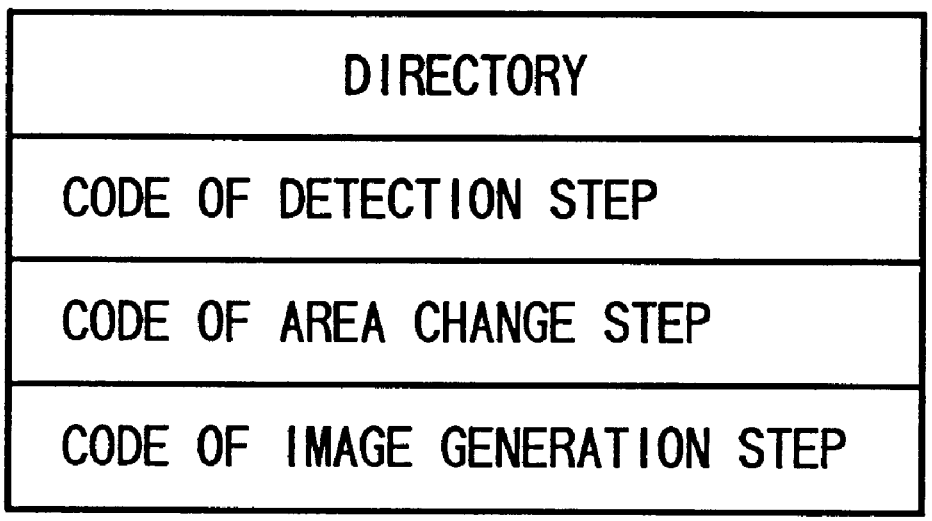
FIGS. 12A and 12B are views of memory maps in programs for realizing the control procedure according to the present invention.
Figure 12B:
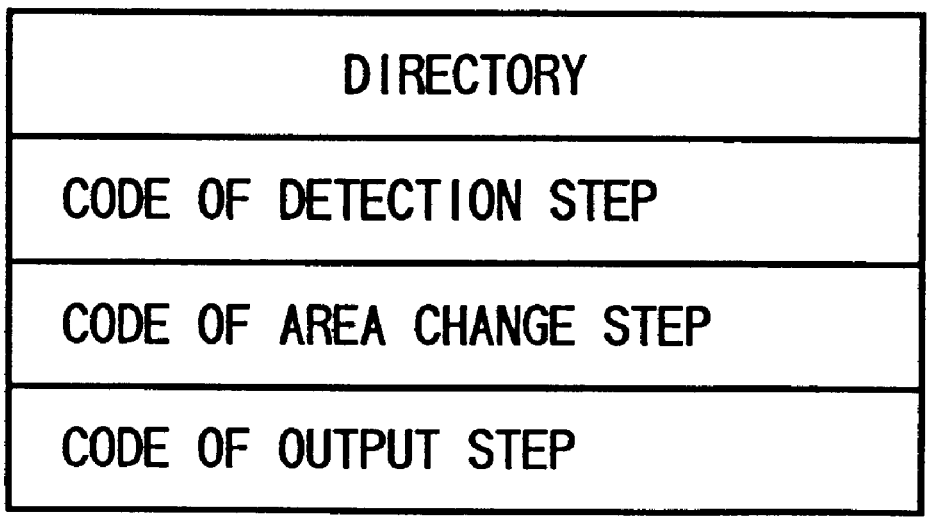

When the present invention is applied to the storage medium, the storage medium stores program codes corresponding to the above-described flow charts. Briefly speaking, modules shown in a memory map shown in FIG. 12A or 12B are stored in the storage medium.

More specifically, the storage medium may store at least a code of the detection step of detecting an error state of each output device, a code of, when an error state is detected from one output device in the detection step, decreasing the capacity of a storage area allocated to the output device from which the error state is detected and increasing the capacity of a storage area allocated to the other output device from which no error state is detected, and a code of the image generation step of independently generating image data for the output devices using the storage areas allocated to the output devices and storing the image data.

Alternatively, the storage medium may store a code of the detection step of detecting an error state of each output device, a code of the image generation step of independently generating image data for the output devices using storage areas allocated to the output devices, and a code of the output step of, when an error state is detected from one output device in the detection step, storing the entire image data generated for the output device from which the error state is detected and outputting the image data generated for the output device from which no error state is detected to the output device.

Figure 23:
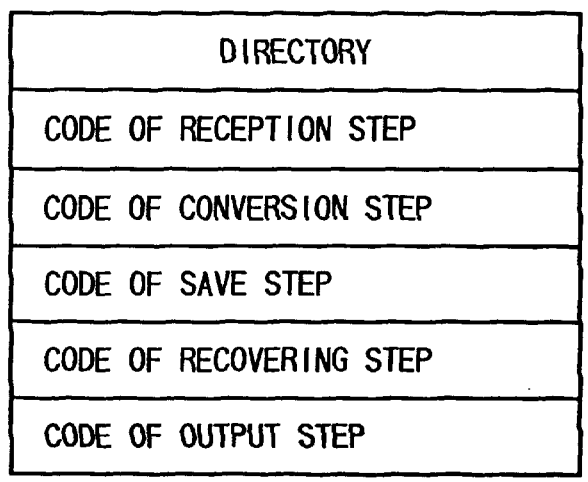
FIG. 23 is a view showing a memory map in a program executed by the image processing apparatus according to the present invention.

Alternatively, modules shown in a memory map example shown in FIG. 23 are stored in the storage medium.

More specifically, the storage medium may store at least a code of the reception step of receiving image information to be formed as an image by a first or second image forming apparatus, a code of the conversion step of converting the image information received in the reception step into image data having a format adapted to the first or second image forming apparatus and storing the image data in a storage means, a code of the save step of receiving the state of the image forming apparatus to which the image data stored in the storage means is to be output and, when image formation is disabled, saving the image data obtained in the conversion step to a storage area different from the storage means, a code of the recovering step of receiving the state of the image forming apparatus for forming the image data saved in the save step and, when image formation is enabled, recovering the image data to the storage means on the basis of the data saved in the save step, and a code of the output step of outputting the image data stored in the storage means to the first or second image forming apparatus for forming the image data.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus connected to at least two output devices, comprising:

memory means whose memory areas are respectively allocated to said output devices;

allocation means for allocating memory areas, to the output devices respectively, which are used for generating image data based upon PDL data by the output devices;

detection means for detecting states of said output devices; and memory reallocation means for, upon detecting an error state in a first output device by said detection means, changing an allocation of the memory areas allocated to the output devices by said allocation means so that at least part of the memory area allocated to said first output device in which the error state is detected is allocated to a second output device in which no error state is detected.

2. The apparatus according to claim 1, further comprising reception means for receiving print data described in a page description language, and an image generation means for generating bit map image data on the basis of the print data received by said reception means.

3. The apparatus according to claim 1, wherein when the error state is detected in one output device by said detection means, said memory reallocation means cancels allocation of the memory area to said one output device in which the error state is detected, and allocates the memory area to the other output device in which no error state is detected.

4. The apparatus according to claim 1, wherein when the error state is detected in one output device by said detection means, said memory reallocation means reduces the memory area for said one output device in which the error state is detected to a size allowing generation of an image, and allocates the memory area to the other output device in which no error state is detected.

5. The apparatus according to claim 1, wherein a size of the area allocated to each of said output devices is determined on the basis of at least one of a print resolution, the number of colors, and a paper size of each output device.

6. The apparatus according to claim 1, wherein a size of the memory area allocated to each of said output devices is set as a size desired by a user.

7. The apparatus according to claim 1, wherein said memory means includes a semiconductor memory, and the memory area is allocated to said semiconductor memory.

8. The apparatus according to claim 1, wherein said memory area compresses the image data and stores the compressed image data.

9. An image processing method in an information processing apparatus connected to at least two output devices, comprising:

an allocation step of allocating memory areas in a memory, to the output devices respectively, which are used for generating image data based upon PDL data by the output devices;

a detection step of detecting states of said output devices;

a memory reallocation step of, upon detecting an error state in a first output device in the detection step, changing an allocation of the memory areas allocated to the output devices in the allocating step so that at least part of the memory area allocated to said first output device in which the error state is detected is allocated to a second output device in which no error state is detected.

10. The method according to claim 9, further comprising a reception step of receiving print data described in a page description language, and an image generation step of generating bit map image data on the basis of the print data received in the reception step.

11. The method according to claim 9, wherein when the error state is detected in one output device in the detection step, the memory reallocation step includes canceling allocation of the memory area to said one output device in which the error state is detected, and allocating the memory area to the other output device in which no error state is detected.

12. The method according to claim 9, wherein when the error state is detected in one output device in the detection step, the memory reallocation step includes reducing the memory area for said one output device in which the error state is detected to a size allowing image generation, and allocating the memory area to the other output device in which no error state is detected.

13. The method according to claim 9, wherein a size of the memory area allocated to each of said output devices is determined on the basis of at least one of a print resolution, the number of colors, and a paper size of each output device.

14. The method according to claim 9, wherein a size of the memory area allocated to each of said output devices in the area change step is set as a size desired by a user.

15. The method according to claim 9 wherein the image data is compressed and stored.

16. An image processing system including an image processing apparatus and at least two image forming apparatuses, wherein said image processing apparatus comprises:

memory means whose memory areas are respectively allocated to said image forming apparatuses;

allocation means for allocating memory areas, to the image forming apparatuses respectively, which are used for generating image data based upon PDL data by the image forming apparatuses;

detection means for detecting states of said image forming apparatuses;

memory reallocation means for, upon detecting an error state in a first image forming apparatus by said detection means, changing an allocation of the memory areas allocated to the image forming apparatuses by said allocation means so that at least part of the memory area allocated to said first image forming apparatus in which the error state is detected is allocated to a second image forming apparatus in which no error state is detected, and wherein each image forming apparatus comprises:
reception means for receiving the image data generated by said image processing apparatus; and
output means for printing the received image data.

17. The system according to claim 16, wherein the image data is generated on the basis of data described in a page description language.

18. The system according to claim 16, further comprising image generation means for independently developing image data for said image forming apparatuses.

19. The system according to claim 16, wherein each memory area of said memory means is determined on the basis of a print resolution, a printable mode, and a printable paper size of each image forming apparatus.

20. The system according to claim 16, wherein an allocation amount of each memory area of said memory means is set by a user.

21. Program steps which are stored in a computer-readable storage medium and which are executable by a computer to output an image from at least two output devices, comprising:

an allocation step of allocating memory areas in a memory, to the output devices respectively, which are used for generating image data based upon PDL data by the output devices;

a detection step of detecting states of said output devices; and a memory reallocation step of, upon detecting an error state in a first output device in the detection step, changing an allocation of the memory areas allocated to the output devices in said allocation step so that at least part of the memory area allocated to said first output device in which the error state is detected is allocated to a second output device in which no error state is detected.

* * * * *